(12) United States Patent
Kiukkonen

(10) Patent No.: US 9,736,294 B2
(45) Date of Patent: Aug. 15, 2017

(54) METHOD AND APPARATUS FOR PROVIDING COORDINATED OPERATION OF MULTIPLE MOBILE COMMUNICATION DEVICES

(71) Applicant: Nokia Technologies Oy, Espoo (FI)

(72) Inventor: Niko Kiukkonen, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 14/047,750

(22) Filed: Oct. 7, 2013

(65) Prior Publication Data
US 2015/0099505 A1    Apr. 9, 2015

(51) Int. Cl.
*H04M 3/00* (2006.01)
*H04M 1/725* (2006.01)
*H04W 8/22* (2009.01)

(52) U.S. Cl.
CPC ......... *H04M 1/72569* (2013.01); *H04W 8/22* (2013.01)

(58) Field of Classification Search
CPC .................................................. H04W 8/245
USPC ............... 455/419, 418, 453, 414.2; 709/217
See application file for complete search history.

(56) References Cited

U.S. PATENT DOCUMENTS

| 8,320,894 B1 | 11/2012 | Raghunath et al. |
|---|---|---|
| 8,484,344 B2 | 7/2013 | Butterfield et al. |
| 9,307,374 B2 * | 4/2016 | DeLuca ................. H04W 12/08 |
| 2002/0151297 A1 | 10/2002 | Remboski et al. |
| 2004/0128382 A1 | 7/2004 | Shimoda et al. |
| 2007/0254728 A1 | 11/2007 | Moallemi et al. |
| 2009/0275367 A1 | 11/2009 | Reinish et al. |
| 2012/0250517 A1 | 10/2012 | Saarimaki et al. |
| 2012/0252425 A1 | 10/2012 | Moeglein et al. |
| 2013/0143529 A1 | 6/2013 | Leppanen |
| 2014/0141714 A1 * | 5/2014 | Ghosh ..................... H04L 29/08 455/39 |
| 2014/0244782 A1 * | 8/2014 | Beaurepaire et al. ........ 709/217 |

OTHER PUBLICATIONS

Notification of Transmittal of The International Search Report and The Written Opinion of the The International Searching Authority, or The Declaration; International Search Report; Written Opinion of the The International Searching Authority for corresponding International Application No. PCT/FI2014/050734, dated Dec. 2, 2014, 17 pages.
Office Action for corresponding European Patent Application No. 14851639.6-1972, dated May 29, 2017, 7 pages.

* cited by examiner

*Primary Examiner* — Chuck Huynh
(74) *Attorney, Agent, or Firm* — Ditthavong & Steiner, P.C.

(57) ABSTRACT

An approach is provided for determining contextual information for at least one first device and at least one second device. Then, the coordination platform processes and/or facilitates a processing of the contextual information to determine one or more functions to deactivate the at least one first device. Subsequently, the coordination platform causes at least in part, an activation of the one or more functions at the at least one second device. Ultimately, the coordination platform causes, at least in part, a transfer of the one or more functions from the at least one first device to the at least one second device. Finally, the coordination platform causes, at least in part, a deactivation of the one or more functions at the at least one first device.

20 Claims, 17 Drawing Sheets

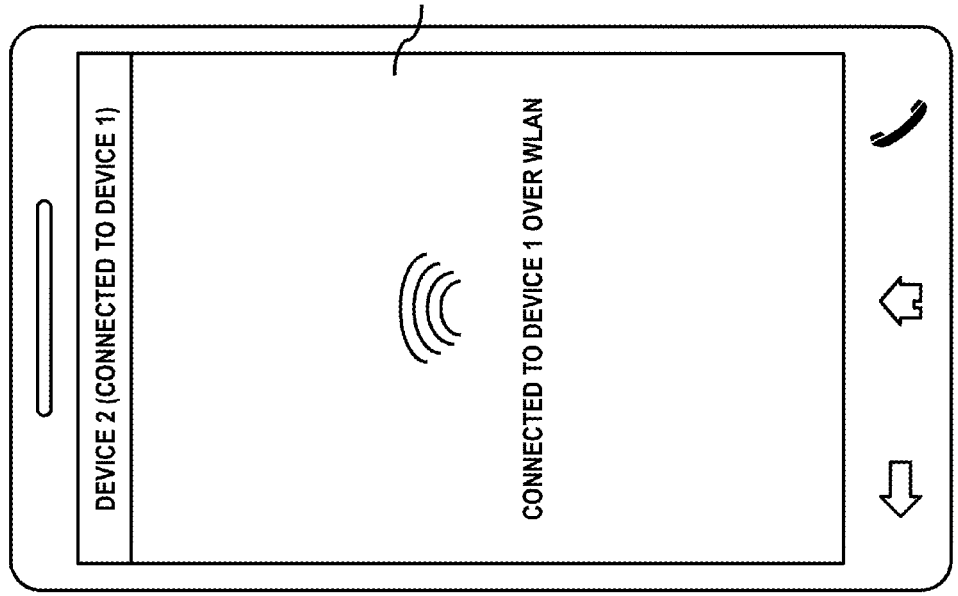
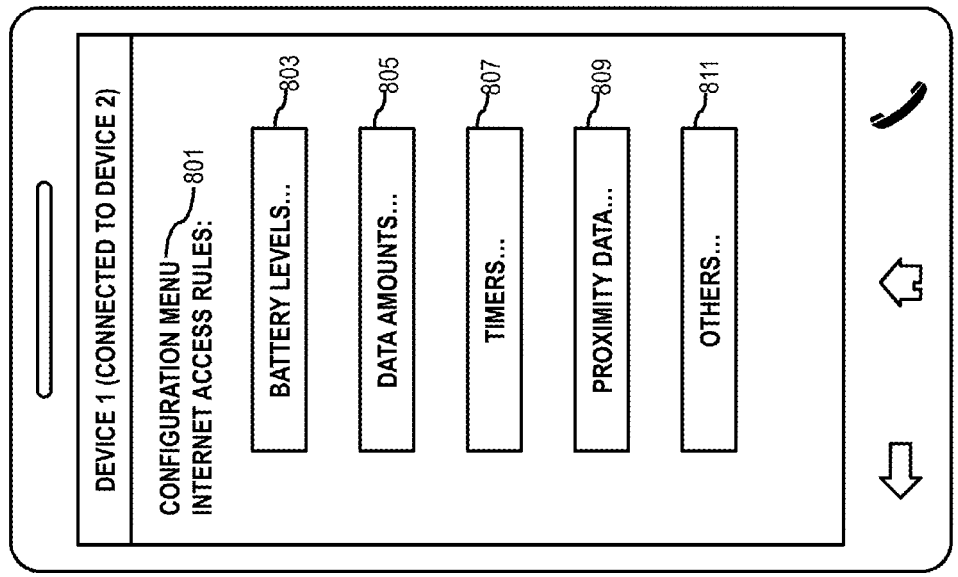
FIG. 8

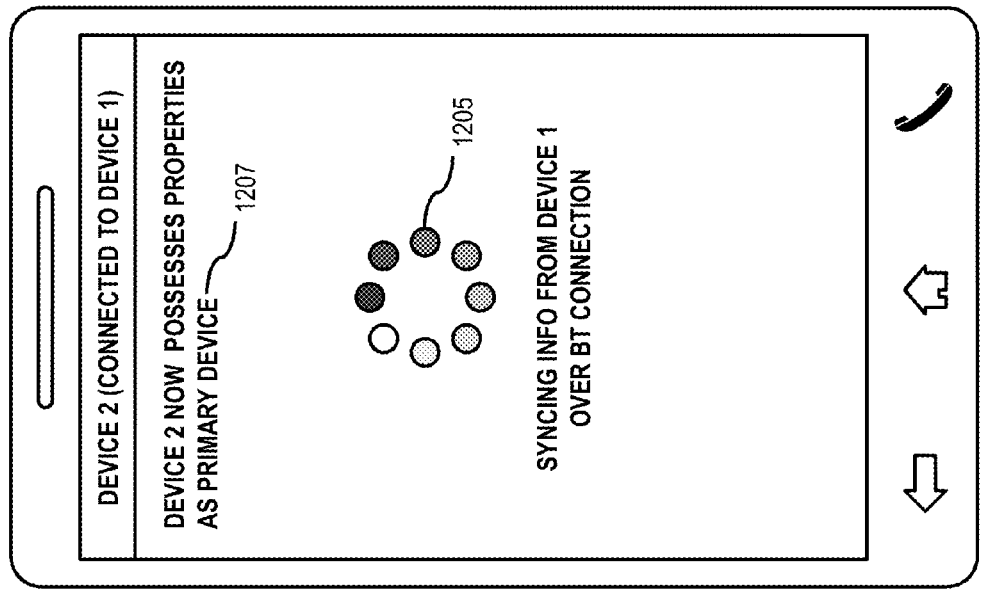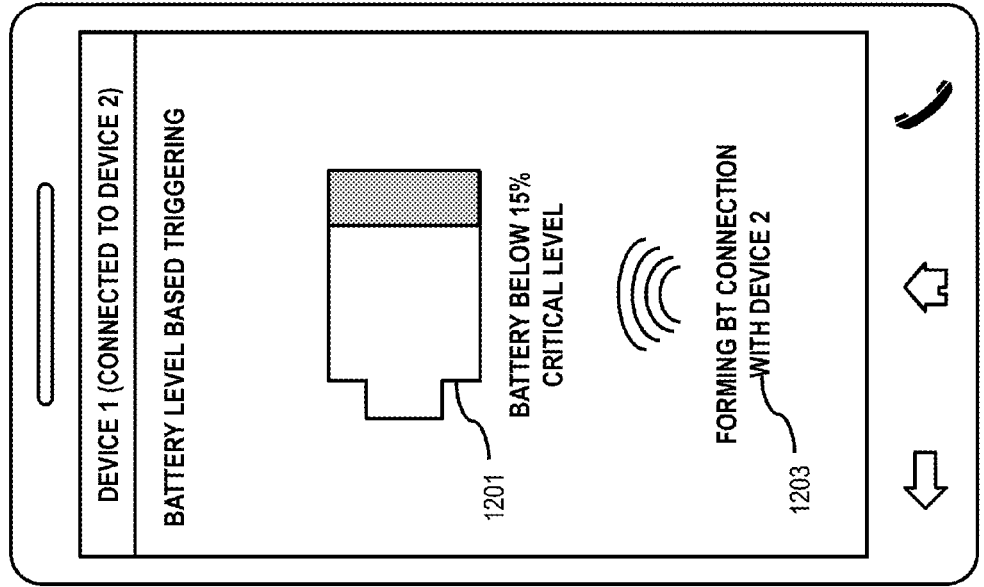
FIG. 12

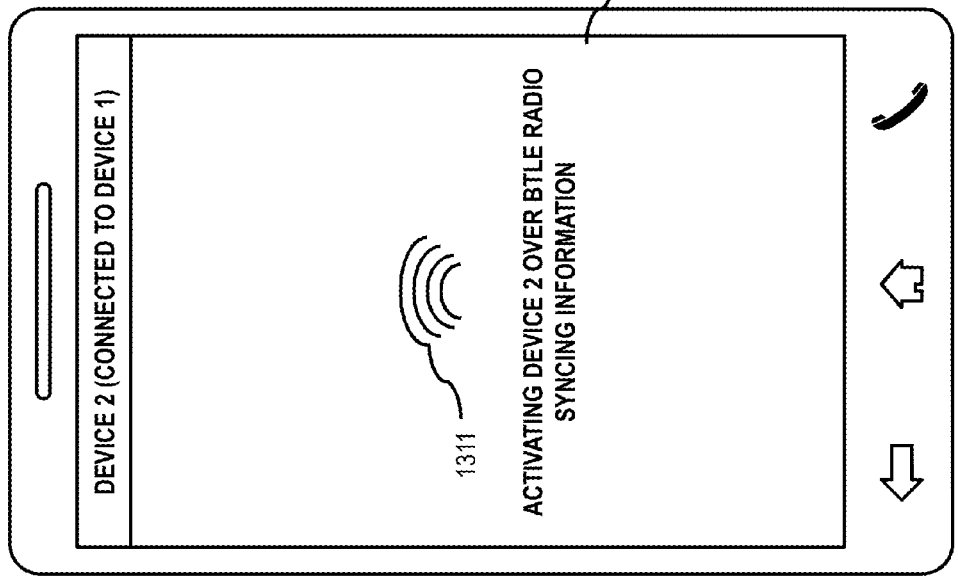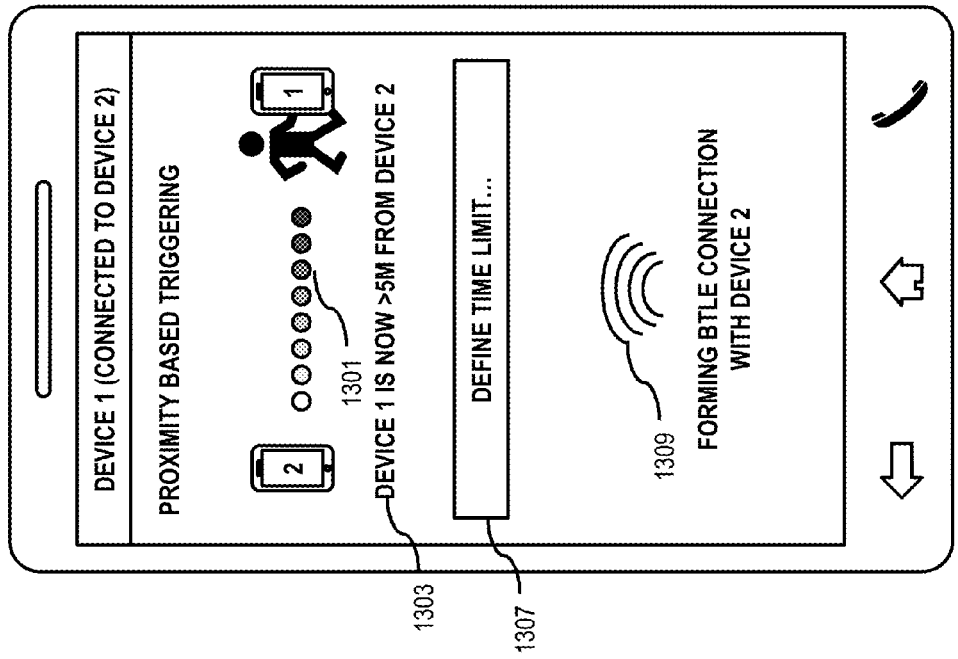
FIG. 13

METHOD AND APPARATUS FOR PROVIDING COORDINATED OPERATION OF MULTIPLE MOBILE COMMUNICATION DEVICES

BACKGROUND

Mobile communication devices provide the benefit of portability while allowing the users to multi task henceforth becoming ubiquitous to everyday life. However, the constant use of multiple functionalities can quickly drain the battery of a mobile communication device or deplete their resource availability, thereby rendering the mobile communication device temporarily inoperable. Given our increasing reliance on mobile communication devices, being without such functionalities, even for a short period of time, may reduce consumer satisfaction. Therefore, service providers and device manufacturers are continually challenged to deliver value and convenience to consumers by, for example, configuring two or more mobile communication devices and synchronizing their data information to trigger one or more actions to ensure continuity of one or more functionalities.

SOME EXAMPLE EMBODIMENTS

Therefore, there is a need for an approach for processing contextual information of at least one device and/or at least one other device, to activate one or more functions at the at least one other device upon deactivating the at least one device.

According to one embodiment, a method comprises determining contextual information for at least one first device and at least one second device. The method also comprises processing and/or facilitating a processing of the contextual information to determine one or more functions to deactivate the at least one first device. The method further comprises causing, at least in part, an activation of the one or more functions at the at least one second device. The method additionally comprises causing, at least in part, a transfer of the one or more functions from the at least one first device to the at least one second device. The method furthermore causes, at least in part, a deactivation of the one or more functions at the at least one first device.

According to another embodiment, an apparatus comprises at least one processor, and at least one memory including computer program code for one or more computer programs, the at least one memory and the computer program code configured to, with the at least one processor, cause, at least in part, the apparatus to determine contextual information for at least one first device and at least one second device. The apparatus is also caused to process and/or facilitate a processing of the contextual information to determine one or more functions to deactivate the at least one first device. The apparatus is further caused to cause, at least in part, an activation of the one or more functions at the at least one second device. The apparatus is additionally caused to cause, at least in part, a transfer of the one or more functions from the at least one first device to the at least one second device. The apparatus is furthermore caused to cause, at least in part, a deactivation of the one or more functions at the at least one first device.

According to another embodiment, a computer-readable storage medium carries one or more sequences of one or more instructions which, when executed by one or more processors, cause, at least in part, an apparatus to determine contextual information for at least one first device and at least one second device. The apparatus is also caused to process and/or facilitate a processing of the contextual information to determine one or more functions to deactivate the at least one first device. The apparatus is further caused to cause, at least in part, an activation of the one or more functions at the at least one second device. The apparatus is additionally caused to cause, at least in part, a transfer of the one or more functions from the at least one first device to the at least one second device. The apparatus is furthermore caused to cause, at least in part, a deactivation of the one or more functions at the at least one first device.

According to another embodiment, an apparatus comprises means for determining contextual information for at least one first device and at least one second device. The apparatus also comprises means for processing and/or facilitating a processing of the contextual information to determine one or more functions to deactivate the at least one first device. The apparatus further comprises means for causing, at least in part, an activation of the one or more functions at the at least one second device. The apparatus additionally comprises means for causing, at least in part, a transfer of the one or more functions from the at least one first device to the at least one second device. The apparatus furthermore comprises means for causing, at least in part, a deactivation of the one or more functions at the at least one first device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8-14 are diagrams of user interfaces utilized in the processes of FIG. 3, according to various embodiments;

DESCRIPTION OF SOME EMBODIMENTS

Examples of a method, apparatus, and computer program for processing contextual information of at least one device and/or at least one other device, to activate one or more functions at the at least one other device upon deactivating the at least one device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Nowadays it is more common for users to carry multiple mobile communication devices. One of the reasons to carry multiple mobile communication devices may be to have a device with rather simple functionality combined with a long battery life to compensate the short operating times of the high end mobile communication devices. Another reason to carry multiple mobile communication devices can be for cost efficiency, wherein a device with cheaper contract charges may be used to offset the shortcoming of the device with expensive contract rates. In one scenario, by carrying multiple mobile communication devices people have the assurance of being able to call others and/or be reached when needed even if the at least one mobile communication device malfunctions. In one example embodiment, the at least one second mobile communication device may be triggered based, at least in part, on the first mobile communication devices status information and/or configuration settings. Therefore, there is a requirement for a service enabling two or more devices to interact and trigger specific configurable actions based on the devices' contextual information.

Figure 1:
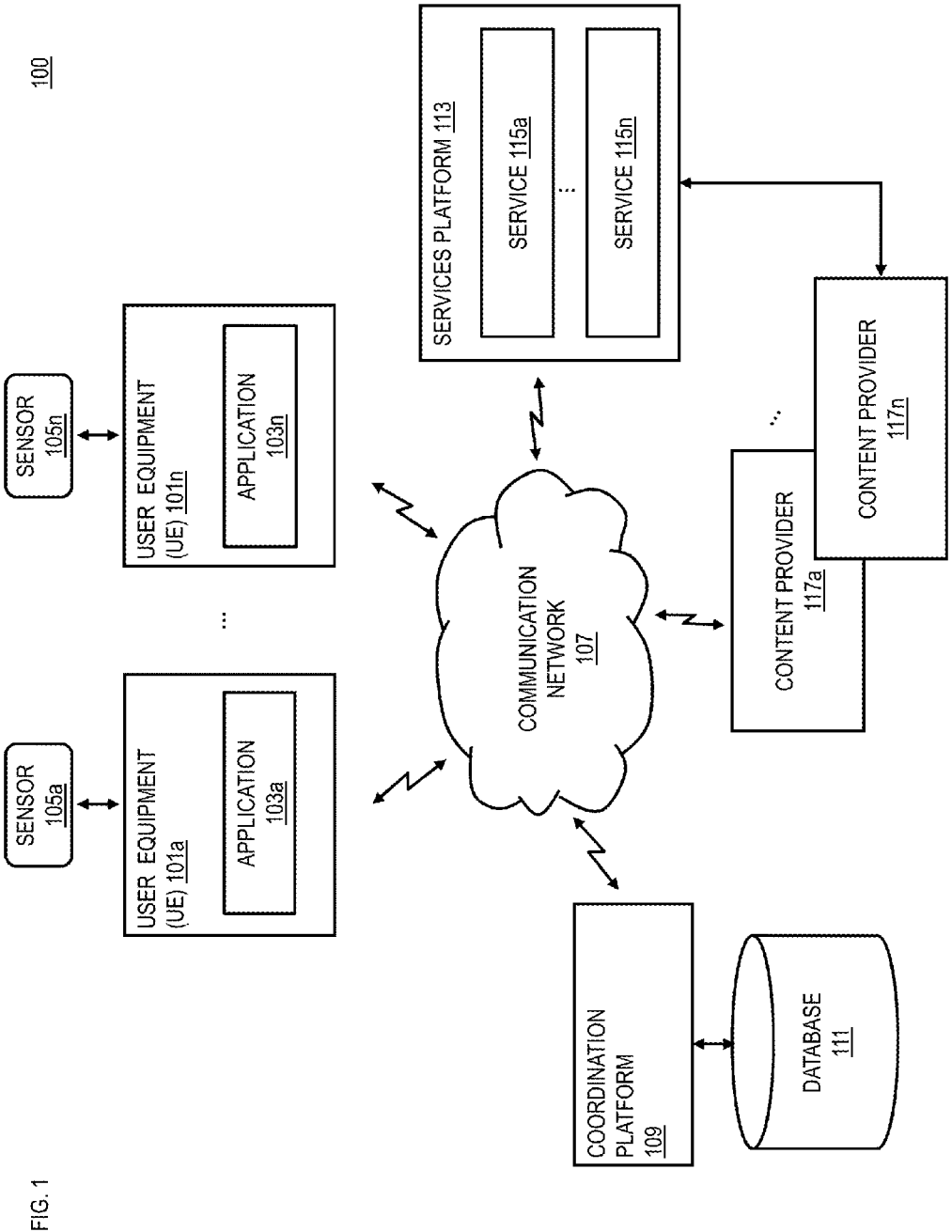
FIG. 1 is a diagram of a system capable of processing contextual information of at least one device and/or at least one other device, to activate one or more functions at the at least one other device upon deactivating the at least one device, according to one embodiment.

To address this problem, a system 100 of FIG. 1 introduces the capability to enable at least one first device to automatically trigger a data connection with at least one second device based, at least in part, on the contextual information of the one or more devices. In one scenario, there may be an automatic triggering of the at least one second device based, at least in part, on the contractual rate, for instance, routing of data connection through at least one second device having flat contract rate instead of consuming more expensive data from the at least one first device. In other words, FIG. 1 discloses a mechanism to automatize and provide a coordinated operation of multiple mobile devices. In another example embodiment, if the user makes a voice call with device having more expensive contract, then the voice call is routed through the device with less expensive voice call cost.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the coordination platform 109, the services platform 113, and the content providers 117a-117n (collectively referred to as content providers 117) via the communication network 107. In one embodiment, the coordination platform 109 performs one or more functions associated with processing contextual information of at least one device and/or at least one other device, to activate one or more functions at the at least one other device upon deactivating the at least one device.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be included within the one or more vehicles.

By way of example, the applications 103 may be any type of application that is executable at the UE 101, such as, location-based services (e.g., providing proximity information), messaging applications (e.g., SMS, MMS, etc.), an Internet browser, media applications (e.g., music and/or video streaming, photo exchange, etc.), social networking applications, etc. In one embodiment, the applications 103 may determine context information associated with at least one UE 101, at least one other UE 101, or a combination thereof via context processing module 303. More specifically, the context information is based, at least in part, on battery information, device capability information (e.g., an operating system, audio/video capabilities, memory capacity, etc.), resource availability information (e.g., data plan and/or service rate), user preference (e.g., one or more preferences regarding forwarding and/or accepting one or more functionalities), or a combination thereof. By way of example, if the at least one other device had less battery life than the at least one device, and/or was unable to display messages and/or photos and/or videos, transferring one or more functionalities may not make sense. In another example embodiment, the applications 103 may determine proximity information for two or more UE 101 via sensors 105 based, at least in part, on the one or more short-range communication technologies, one or more user inputs, or a combination thereof. By way of example, the applications 103 may determine proximity of two or more devices based, at least in part, on at least one connection to a Bluetooth, BLE, or WiFi network. In another example use case, the applications 103 may determine the location of the at least one device, at least one other device, or a combination thereof based, at least in part, on a user input such as a "check in" on a social networking service.

By way of example, the sensors 105 may be any type of sensor. In certain embodiments, the sensors 105 may include, for example, a network detection sensor for detecting wireless signals or network data, temporal information, a camera/imaging sensor for gathering image data, an audio recorder for gathering audio data, and the like. In one scenario, the sensors 105 may include location sensors (e.g., GPS), audio sensors (e.g., microphone), or receivers for different short-range communications (e.g., Bluetooth, WiFi, near field communication etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the coordination platform 109 may be a platform with multiple interconnected components. The coordination platform 109 may include multiple servers, intelligent networking devices, computing devices, components and corresponding software for processing contextual information of at least one device and/or at least one other device, to activate one or more functions at the at least one other device upon deactivating the at least one device. In addition, it is noted that the coordination platform 109 may be a separate entity of the system 100, a part of the services 115 of the services platform 113, or included within the UE 101 (e.g., as part of the applications 103).

In one embodiment, the coordination platform 109 may cause an establishment of a wireless connection between at least one first device and at least one second device, wherein at least one first device is configured with at least one second device to trigger at least one specific configurable action. In another embodiment, the coordination platform 109 may cause a synchronization of data between the at least one first device and the at least one second device. In one embodiment, the coordination platform 109 determines the contextual information for at least one first device and at least one second device, whereby the coordination platform 109 processes the contextual information to determine one or more functions to deactivate the at least one first device and to activate one or more functions at the at least one second device. In another embodiment, the coordination platform 109 causes transfer of the one or more functions from the at least one first device to the at least one second device over the wireless connection. Subsequently, the coordination platform 109 causes a deactivation of the one or more functions at the at least one first device. In one scenario, the at least one first device is connected to at least one second device via a low power wireless connection, whereby the at least one first device can trigger one or more functions at the at least one second device whenever the at least one first device is out of service, for instance, low battery level, proximity based triggering, user initiated triggering etc.

In one embodiment, the coordination platform 109 may include or be associated with at least one database 111. In one example embodiment, the database 111 may include information of two or more configured and authenticated mobile devices, for example, capability status information associated with the configured mobile devices (e.g., device specifications), one or more user preferences (e.g., transfer content and/or services to my friend Steve's mobile device before any other mobile devices), one or more automatic protocols (e.g., transfer "x" when the battery status is at 60%, transfer "x" and "y" when the battery status is between 60% and 25%, and transfer "x", "y", and "z" when the battery status is below 25%, etc.), or a combination thereof.

In one embodiment, the services platform 113 may include any type of service. By way of example, the services platform 113 may include location based services, navigation services, mapping services, social networking services, content (e.g., audio, video, images, etc.) provisioning services, application services, storage services, contextual information determination services, etc. In one embodiment, the services platform 113 may interact with the UE 101, the coordination platform 109 and the content providers 117 to supplement or aid in the processing of the content information.

By way of example, the services 115 may be an online service that reflects activities of one or more UE 101. The services 115 may include a wide variety of services such as content provisioning services for one or more of the applications 103. By way of example, the services 115 may include phone and electronic communication services (e.g., email, SMS, etc.), location-based services, media related services (e.g., audio/video streaming, picture sharing, etc.), etc. The UEs 101, the services platform 113, and the services 115 also have connectivity to one or more content providers 117.

In one embodiment, the content providers 117 may provide content to the UE 101, the coordination platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in configuring and synchronizing data information between two or more mobile devices. In one embodiment, the content providers 117 may also store content associated with the UE 101, the coordination platform 109, and the services 115 of the services platform 113. In another embodiment, the content providers 117 may manage access to a central repository of data, and offer a consistent, standard interface to data.

By way of example, the UE 101, the coordination platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
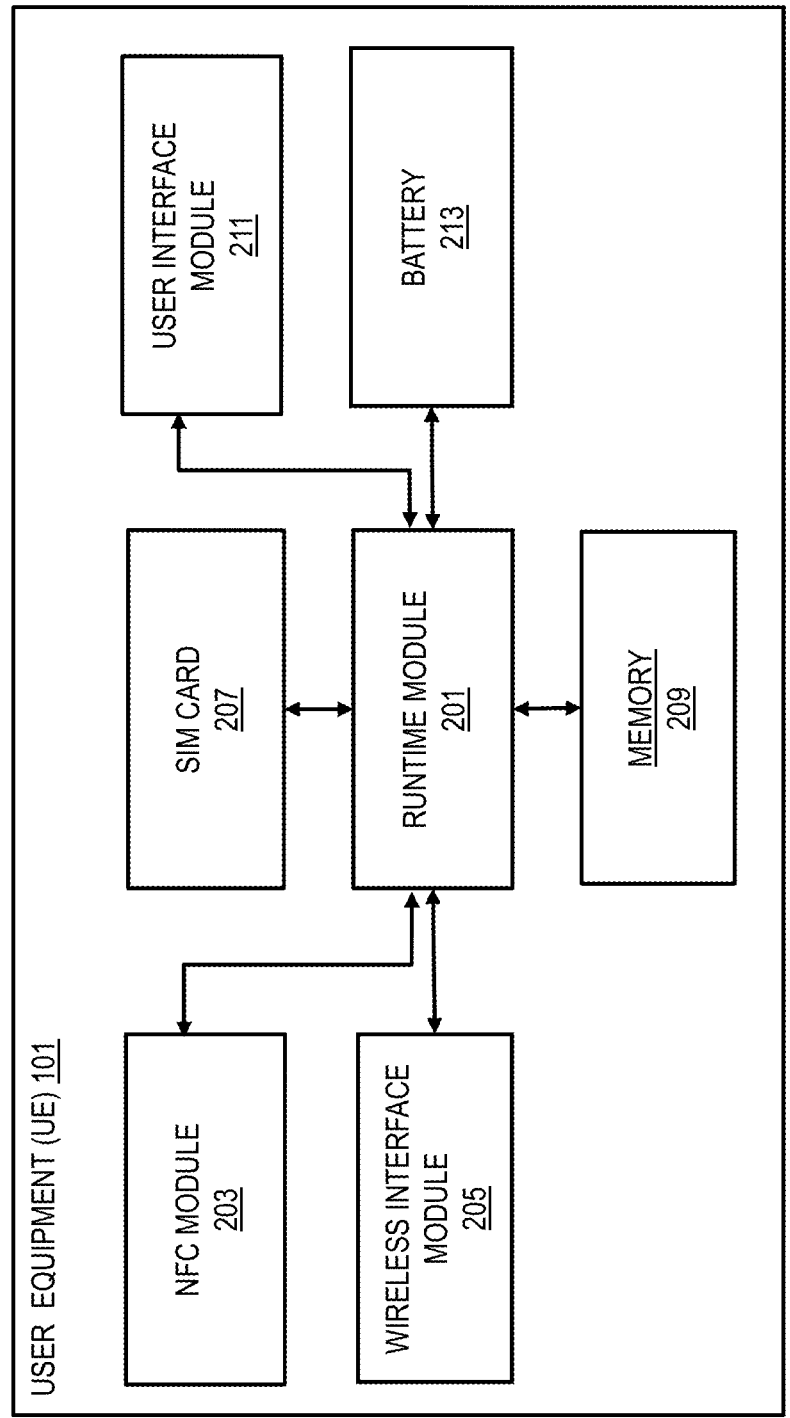
FIG. 2 is a diagram of the components of the user equipment (UE) 101, according to one embodiment.

FIG. 2 is a diagram of the components of a user equipment (UE) 101, according to one embodiment. By way of example, the UE 101 includes one or more components for transferring services and functionality between UE 101*s*. It is contemplated that the functions of these components may be combined in one or more components or performed by other components of equivalent functionality. In this embodiment, the UE 101 includes a runtime module 201, an NFC module 203, a wireless interface module 205, a subscriber identity module (SIM) card 207, a memory 209, and a user interface module 211, all of which are powered by rechargeable battery 213.

In one embodiment, the runtime module 201 executes applications 103 to cause, at least in part, a synchronization of data for at least one device and at least one other device. In another embodiment, the runtime module 201 may cause at least in part, a triggering of at least one specific configurable action based, at least in part, on the activation command from at least one device. In one scenario, the activation command may trigger a routing of the at least one service from at least one UE 101*a* to at least one other UE 101*n*. The applications 103*a* of the UE 101*a* can be set to initiate transfer mode while the applications 103*n* of the second UE 101*n* can be set to a receive transfer mode.

In one embodiment, the NFC module 203 can include an interface to the components for conducting near field communication (NFC) and/or the components themselves. In one embodiment, the NFC technology is a short-range technology that enables two-way interactions between devices. The NFC technology can be used to communicate with smartcards, readers, and other NFC devices (e.g., another UE 101). The NFC can utilize a magnetic field induction (e.g., using antennas) to communicate with other NFC devices that are located within a certain distance. In one implementation, two UEs 101 can use an active NFC communication mode, whereby both can communicate with each other by generating a radio frequency field. In one scenario, the NFC module 203 may provide the coordination platform 109 with proximity information when the two synchronized devices are getting apart, whereby the coordination platform 109 may activate the at least one second UE 101 using BTLE radio. In another example embodiment, a portion of the information transferred via the NFC link may then be utilized by the applications 103*a* of the first UE 101*a* to setup a wireless connection link (e.g., a WLAN, a BLUETOOTH link, a network link over cellular communication, etc.) via communication network 107.

In one embodiment, the wireless interface module 205 can include physical components to transmit data over the wireless connection link as well as a software component.

The wireless interface module 205 may include an identifier that identifies the wireless interface module 205 to other devices to allow for communication. The wireless connection link can be utilized to transfer details of any active or inactive online services from the first UE 101*a* to the second UE 101*n*. The one or more online services can include voice over internet protocol sessions, messaging services, e-mail, or other like online services. The details of the online services can include a service identifier, a service location, service authentication information, the current service state, session information, and other service details that can be used to transfer an online service from the first UE 101*a* to the second UE 101*n*.

In one embodiment, SIM card 207 may include one or more integrated circuits, which generally function to process as well as store digital information. In one embodiment, SIM card 207 carries an identification number unique to the owner and may be the mechanism by which one or more UE 101 is identified by another UE 101. Further, the at least one activation command is based, at least in part, on one or more rules based on SIM card information. In one example embodiment, the one or more SIM card 207 may be configured to securely store keys, for instance, phone numbers, IMSI, or other UE 101*s* details that is used to identify the at least one subscriber. In another example embodiment, SIM cards 207 may be employed by one or more service providers communicating over the communication network 107 to identify UE 101*s*.

In one embodiment, the memory 209 may manage the storage of data for at least one device that is configured with at least one other device to trigger at least one specific configurable action. In another example embodiment, the memory 209 may provide the coordination platform 109 with device capability information, resource availability information, battery level information, proximity information, temporal information, SIM information, status information or a combination thereof.

In one embodiment, the user interface module 211 of the UE 101 can include various methods of communication. For example, the user interface module 211 can include outputs including a visual component (e.g., a screen), an audio component (e.g., amplifiers and speakers), a physical component (e.g., vibrations), and other methods of communication. User inputs can include a touch-screen interface, a scroll-and-click interface, a button interface, a microphone, etc. A user can utilize services from the services platform 113 using, for instance, applications 103 of the UE 101. In one example embodiment, the user interface module 211 employs various application programming interfaces (APIs) or other function calls corresponding to the applications 103 of UE 101, thereby enabling the display of graphics primitives such as menus, buttons, data entry fields, etc., for generating the user interface elements. By way of example, the user interface module 211 generates the user interface element in response to detection of an input from coordination platform 109. As another example, the user interface module 211 causes a presentation of one or more configurable actions of at least one first UE 101 that may be routed to at least one second UE 101.

In one embodiment, the battery 213 provides power to various components of UE 101, and is rechargeable. The status of the battery depends on various factors, for instance, the battery level is affected by the loads on the battery caused by the amount of use of the applications in the UE 101. In one scenario, a smart UE 101 may have advanced software features than basic UE 101, whereby the user of the smart UE 101 may use the features more often thereby depleting the life of the battery. In one scenario, the battery level in a smart UE 101 may decrease faster than the life of the battery of the basic phone. In one example embodiment, the coordination platform 109 may cause a routing of one or more communication associated with at least one first device to at least one second device based, at least in part, on a determination that the battery level for at least one first device is below a minimum threshold.

Figure 3:
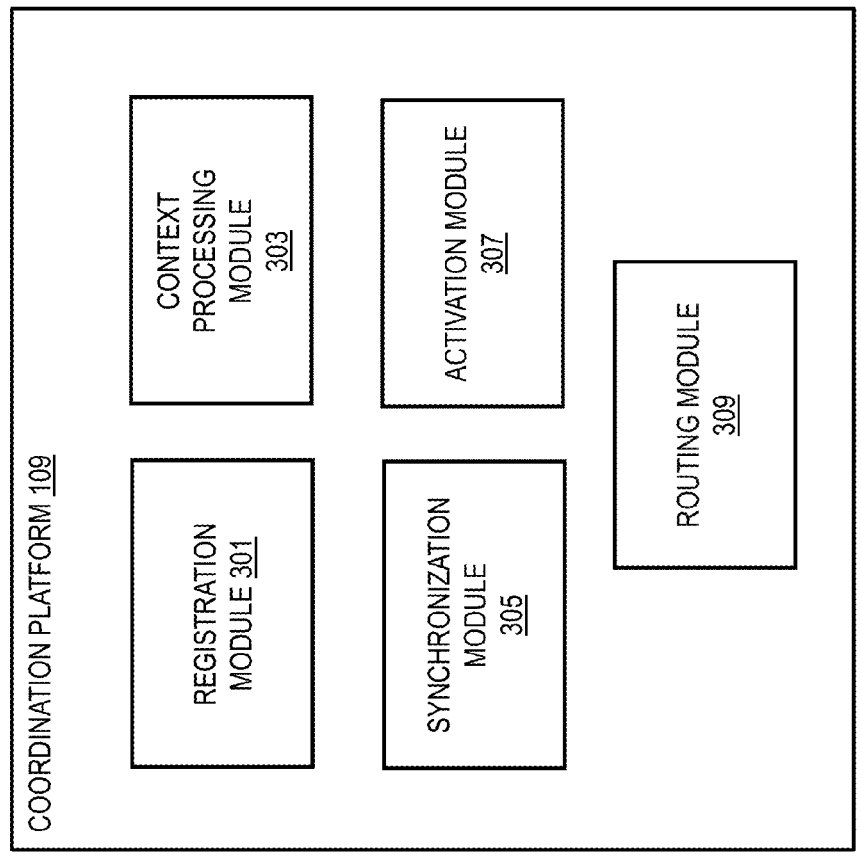
FIG. 3 is a diagram of the components of the coordination platform 109, according to one embodiment.

FIG. 3 is a diagram of the coordination platform 109 for processing contextual information of at least one device and/or at least one other device, to activate one or more functions at the at least one other device upon deactivating the at least one device. By way of example, the coordination platform 109 may include a registration module 301, a context processing module 303, a synchronization module 305, an activation module 307, and a routing module 309. It is contemplated that the functions of these components may be combined in one or more components or performed by other components of equivalent functionality.

In one embodiment, the registration module 301 registers the one or more UE 101 to trigger at least one specific configurable action by causing a synchronization of data between the one or more registered devices. In an example embodiment, the registration process performed by the registration module 301 may include authenticating a UE 101 identification value as provided or established for a particular UE 101 during a registration process with the service provider. The UE 101 identification value may be received as an input provided by either the user and/or the UE 101 to the coordination platform 109. In one embodiment, the registration process may be performed through automated association of profile settings maintained with an IP address, a carrier detection signal of a user device, mobile directory number (MDN), subscriber identity module (SIM), radio frequency identifier (RFID) tag or other identifier. In one example embodiment, the coordination platform 109 may selectively route communications from at least one registered UE 101 to the at least one other registered UE 101 based, at least in part, on device capability information, resource availability information, user configuration, or a combination thereof.

In one embodiment, the context processing module 303 may be used to determine context information associated with at least one device, at least one other device, or a combination thereof. By way of example, the context information may include battery status, operation status (e.g., running at least one application), capability status (e.g., an operating system, memory capacity, etc.), proximity information, user configuration information, temporal information, SIM information, status information, user preferences, or a combination thereof. The context processing module 303, in connection with the communication network 107 may also be used to determine at least one location of the at least one device, the at least one other device, or a combination thereof based, at least in part, on one or more short-range communication technologies, one or more user inputs, or a combination thereof.

In one embodiment, the synchronization module 305 may be used to synchronize data between the one or more registered UE 101*s*. The synchronization between the one or more UE 101 may be accomplished via near field communication, Bluetooth, Bluetooth low energy (BTLE), wireless fidelity, or a combination thereof. The data synchronization between one or more UE 101 may function to maintain data consistency between the different UE 101 such that changes made to data on the at least one UE 101 are transmitted to and resolved with data on the other UE 101. In one scenario, the one or more UE 101 may be configured to synchronize contextual information, text messaging, emails, voice mails, phone call, and any other means of communication between one or more UE 101. In one example embodiment, since the one or more UE 101 may include different capabilities, the synchronization module 305 may work with the context processing module 303 for data synchronization between the one or more UE 101s. In scenario, the coordination platform 109 may cause synchronization of data between one or more registered UE 101 when the battery life of the at least one UE 101 falls below a threshold indicating that the battery for the at least one UE 101 needs to be recharged. In one embodiment, the synchronization module 305 causes data adjustment to accommodate the capacity of the one or more UE 101.

In one embodiment, the activation module 307 may cause a triggering of at least one specific configurable action based, at least in part, on the activation command from at least one device. In one embodiment, the at least one specific configurable action include, at least in part, one or more phone calls, one or more electronic communications, or a combination thereof. In another example embodiment, the activation command is based, at least in part, on one or more rules based on battery level information, proximity information, user configuration, temporal information, Subscriber Identity Module (SIM) information, status information, or a combination thereof. In another example embodiment, the activation module 307 may cause activation or a deactivation of at least one device, or at least one other device based, at least in part, on proximity information, temporal information, or a combination thereof. In another example embodiment, the activation module 307 may cause an activation of at least one configurable action for the targeted UE 101 based, at least in part, on a targeted communication.

In one embodiment, the routing module 309 may be used to cause a routing of one or more communication associated with at least one first device to at least one second device based, at least in part, on a determination that the battery level for at least one first device is below a minimum threshold. In one embodiment, the routing module 309 may cause a routing of one or more communication to at least one second device based, at least in part, on a determination that a specific service is unavailable in at least one first device. In one embodiment, the routing module 309 may cause a routing of one or more functionalities of at least one device to at least one other device based, at least in part, on the contractual information. In one embodiment, the routing module 309 may cause a routing based, at least in part, on the at least one selection of the one or more configurable actions by the at least one user.

Figure 4:
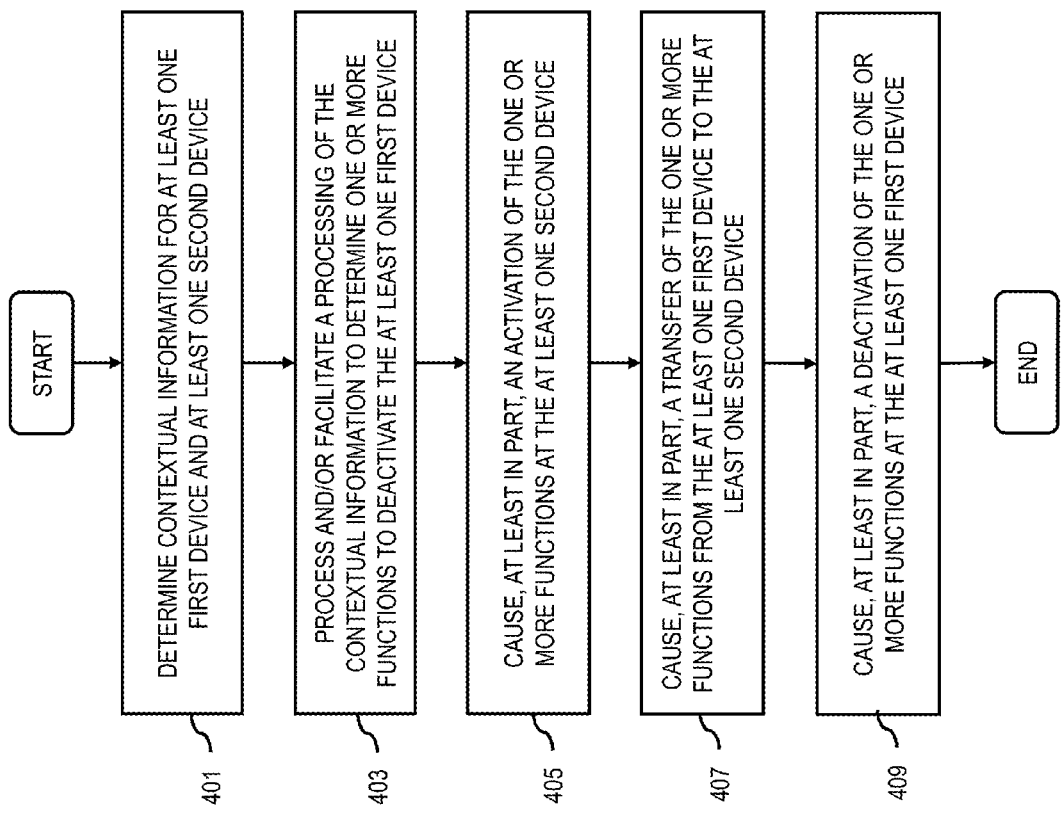
FIG. 4 is a flowchart of a process for processing contextual information of at least one device and/or at least one other device, to activate one or more functions at the at least one other device upon deactivating the at least one device, according to one embodiment.
Figure 16:
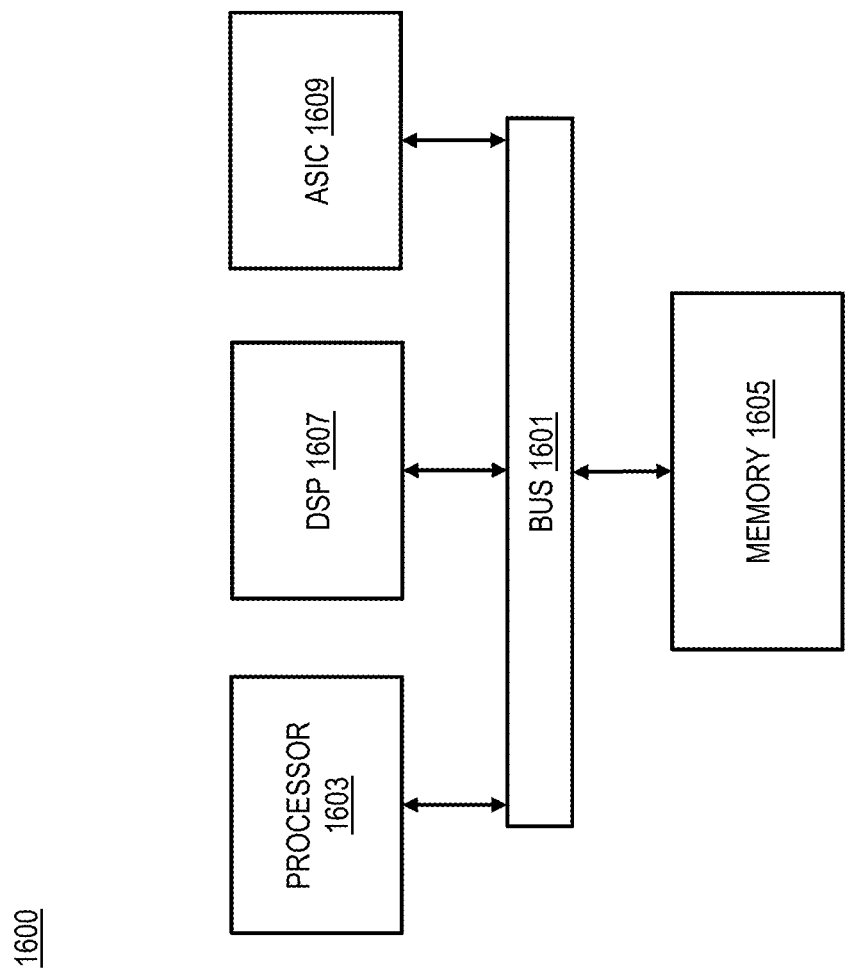
FIG. 16 is a diagram of a chip set that can be used to implement an embodiment of the invention.

FIG. 4 is a flowchart for processing contextual information of at least one device and/or at least one other device, to activate one or more functions at the at least one other device upon deactivating the at least one device. In one embodiment, the coordination platform 109 performs the process 400 and is implemented in, for instance, a chip set including a processor and a memory as shown in FIG. 16.

In step 401, the coordination platform 109 determines the contextual information for at least one first device and at least one second device, wherein the contextual information includes battery level information, proximity information, user configuration, temporal information, Subscriber Identity Module (SIM) information, status information, or a combination thereof.

In step 403, the coordination platform 109 processes and/or facilitates a processing of the contextual information to determine one or more functions to deactivate the at least one first device. In one scenario, the coordination platform 109 processes the contextual information to determine device capability information and/or resource availability information and/or user configuration and/or any other information for the at least one first device, whereby the coordination platform 109 determines whether to deactivate one or more functions at the at least one first device. In one scenario, the coordination platform 109 upon processing the contextual information may determine that the cost of sending an SMS from the at least one first device is costly compared to the at least one second device, whereby the coordination platform 109 may trigger the at least one second device to send the SMS on behalf of the at least one first device. In this manner, routing of one or more functionalities of at least one first device through at least one second device saves money for the one or more users, thereby enhancing user convenience.

In step 405, the coordination platform 109 causes, at least in part, an activation of the one or more functions at the at least one second device. In one scenario, the coordination platform 109 causes a synchronization of data for at least one device and at least one other device, and may cause triggering of one or more configurable action in the at least one second device based, at least in part, on the activation command from at least one first device.

In step 407, the coordination platform 109 causes, at least in part, a transfer of the one or more functions from the at least one first device to the at least one second device. In one scenario, the coordination platform 109 is of determination that the resource availability for sending SMS in the at least one first device has reached its minimum threshold level, whereby the coordination platform 109 may process the contextual information of the at least one second device. The coordination platform 109 may determine that the at least one second device has a flat contract rate for sending an SMS, whereby the coordination platform 109 transfers the function of sending one or more SMS to the second device on behalf of the first device. In one scenario, the minimum threshold may be determined based on user configuration or on an autonomous basis by the coordination platform 109.

In step 409, the coordination platform 109 causes, at least in part, a deactivation of the one or more functions at the at least one first device. In one scenario, the coordination platform 109 upon transferring one or more functions to the at least one second device may temporarily deactivate the transferred functions in the at least one first device. For instance, once the coordination platform 109 transfers the SMS sending function to the at least one second device, it may deactivate sending of SMS through the at least one first device. If the user sends an SMS via at least one first device, the coordination platform 109 may route the SMS through the at least one second device. In such manner, the coordination platform 109 utilizes the unlimited SMS sending facility in the at least one second device to send the SMS of the at least one first device.

Figure 5:
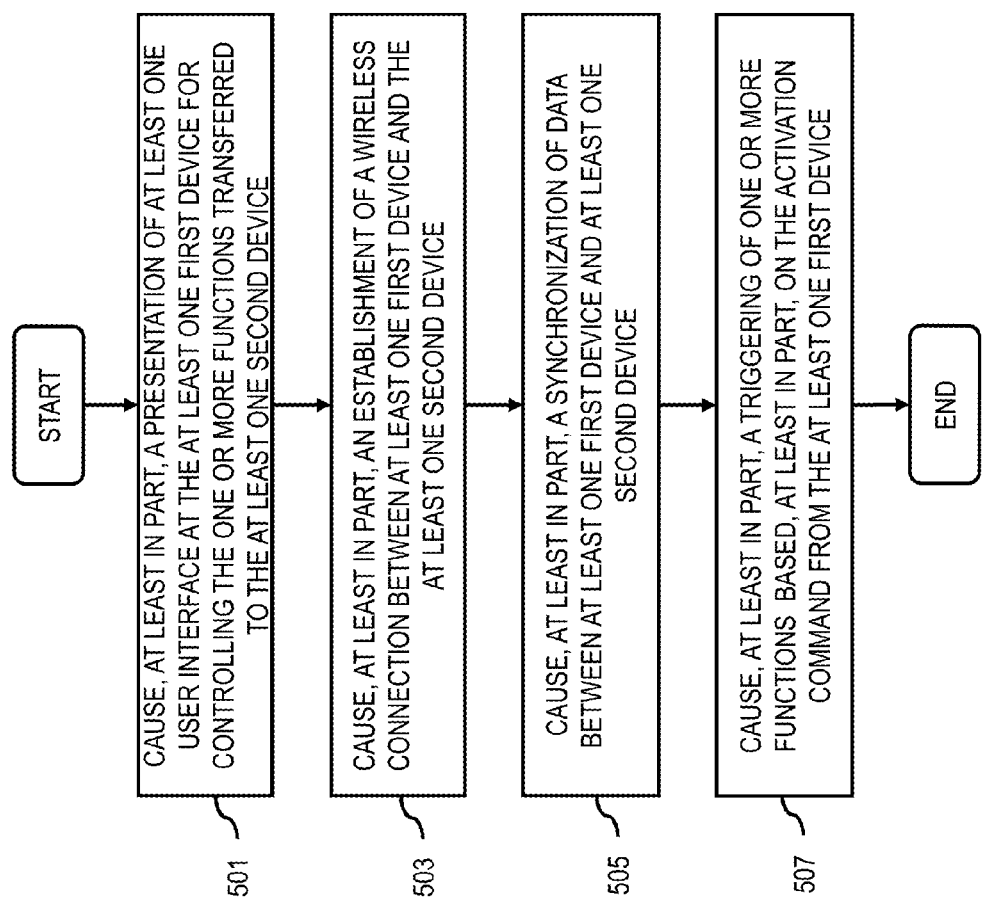
FIG. 5 is a flowchart of a process for causing an establishment of a wireless connection between two or more devices, synchronizing their data and causing a presentation of at least one user interface in the first device for triggering one or more functions at the at least one second device, according to one embodiment.

FIG. 5 is a flowchart of a process for causing an establishment of a wireless connection between two or more devices, synchronizing their data and causing a presentation of at least one user interface in the first device for triggering one or more functions at the at least one second device. In one embodiment, the coordination platform 109 performs the process 500 and is implemented in, for instance, a chip set including a processor and a memory as shown in FIG. 16.

In step 501, the coordination platform 109 causes, at least in part, a presentation of at least one user interface at the at least one first device for controlling the one or more functions transferred to the at least one second device. In one scenario, the coordination platform 109 causes a presentation of the one or more configurable actions of at least one first device that may be transferred to the at least one second device in the user interface of the at least one first device. In another scenario, the coordination platform 109 causes a transfer of one or more actions based, at least in part, on the selection of the actions by the user in the at least one first device.

In step 503, the coordination platform 109 causes, at least in part, an establishment of a wireless connection between at least one first device and the at least one second device, wherein the controlling of the one or more functions is performed over the wireless connection. In one embodiment, the at least one wireless connection is based, at least in part, on near field communication, Bluetooth, Bluetooth low energy (BTLE), wireless fidelity, or a combination thereof.

In step 505, the coordination platform 109 causes at least in part, a synchronization of data between at least one first device and at least one second device. By way of example, user Z is exploring an unfamiliar city and wishes to calculate at least one route on his or her first UE 101. Then, the coordination platform 109 may determine that the data plan for the first UE 101 is limited or depleted or expensive compared to the second UE 101. As a result, the coordination platform 109 triggers the second UE 101 to calculate the route for the unfamiliar city and synchronizes the route information to the first UE 101. In this manner, the user may access the route information in the first UE 101 though the data is gathered by the second UE 101. Furthermore, in one example use case, the coordination platform 109 may determine that the first UE 101 of user Z is running low on battery power. Therefore, the coordination platform 109 can switch the user interface views so that the second UE 101 of user Z is now running the navigation screen which generally consumes more power, and the first UE 101 is put on power save mode to better conserve battery power. As a result, such synchronization of data between the two or more UE 101 assists the coordination platform 109 in determining the most relevant information between the two or more UE 101.

In step 507, the coordination platform 109 causes, at least in part, a triggering of one or more functions based, at least in part, on the activation command from the at least one first device. In one scenario, the coordination platform 109 determines that the second UE 101 has unlimited voice calling service, whereby the coordination platform 109 may send the activation command triggering a transfer of voice calling functions on the second device from the first device.

Figure 6:
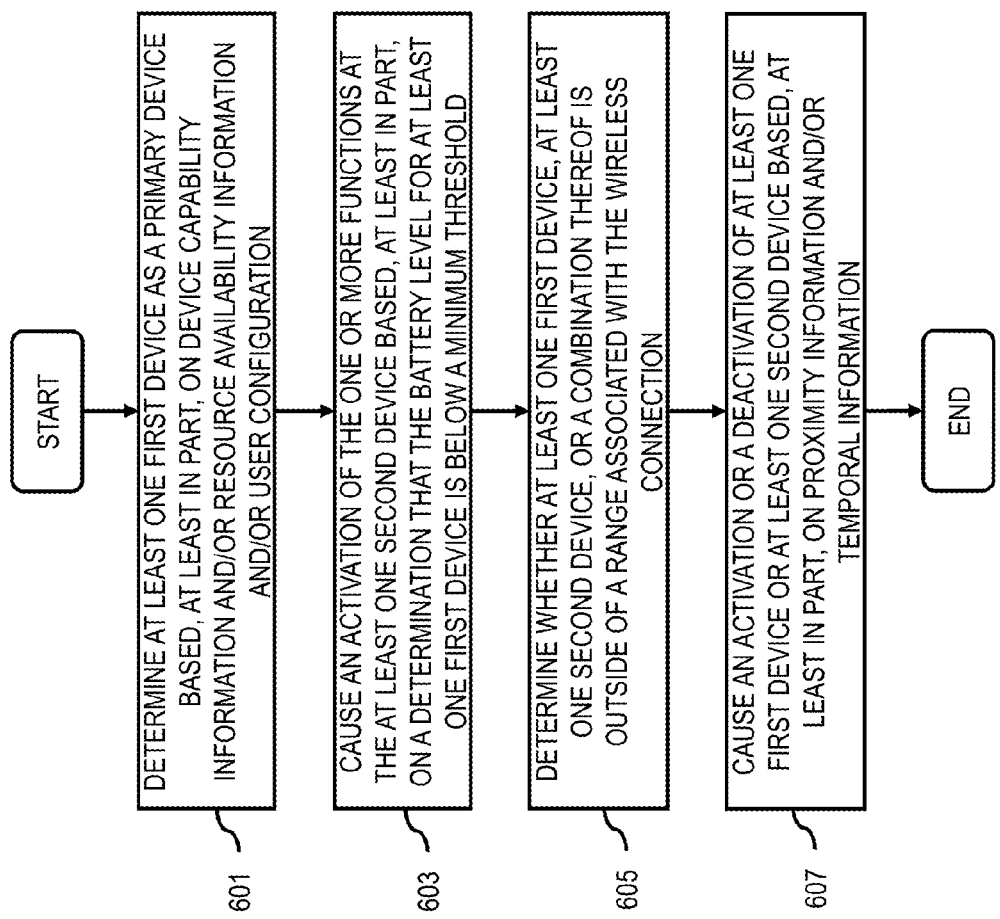
FIG. 6 is a flowchart of a process for determining a primary device from two or more devices and causing an activation or deactivation of the one or function at the at least one second device based on battery level information and/or proximity information, according to one embodiment.

FIG. 6 is a flowchart of a process for determining a primary device from two or more devices and causing an activation or deactivation of the one or more functions at the at least one second device based on battery level information and/or proximity information. In one embodiment, the coordination platform 109 performs the process 600 and is implemented in, for instance, a chip set including a processor and a memory as shown in FIG. 16.

In step 601, the coordination platform 109 determines at least one first device as a primary device based, at least in part, on device capability information, resource availability information, user configuration, or a combination thereof.

In step 603, the coordination platform 109 causes, at least in part, an activation of the one or more functions at the at least one second device based, at least in part, on a determination that the battery level for at least one first device is below a minimum threshold. In one scenario, the coordination platform 109 causes plurality of UE 101 to synchronize, manage and effectively communicate their operational status amongst one another so that communications, calls and data services can be executed optimally. In one scenario, the process involves means by which a first device desiring engagement with a second device enables coordination of the request in a manner that improves battery usage and power consumption of the respective devices. For instance, the first UE 101 being used may fall below a threshold indicating that the battery needs to be recharged soon, at this point the coordination platform 109 may send instruction to the second UE 101 triggering one or more functions of the first UE 101 before the battery of the first UE 101 becomes exhausted.

In step 605, the coordination platform 109 determines whether at least one first device, at least one second device, or a combination thereof, is outside of a range associated with the wireless connection. In one scenario, lost proximity between the first and the second UE 101 may act as a trigger to activate or deactivate at least one UE 101. In one scenario, when the at least one first UE 101 and the at least one second UE 101 are getting apart and exceeds or reaches the user specified distance, the coordination platform 109 may activate the at least one second UE 101. In one scenario, device lock or alerts may be activated when devices are separated beyond the user specified distance.

In step 607, the coordination platform 109 causes, at least in part, an activation or a deactivation of at least one first device, or at least one second device based, at least in part, on proximity information, temporal information, or a combination thereof.

Figure 7:
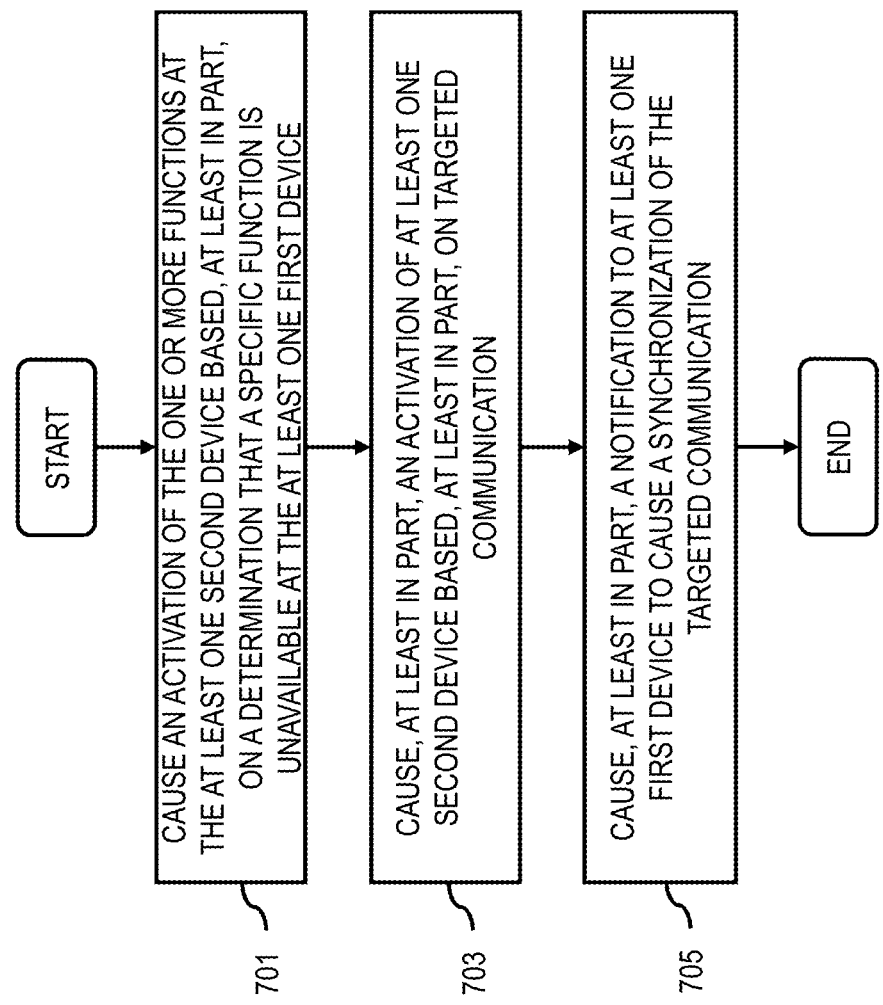
FIG. 7 is a flowchart of a process for causing an activation or deactivation of the one or more functions at the at least one first device and/or the at least one second device based, at least in part, on the unavailability of one or more functions at the at least one first device and/or targeted communication towards at least one second device, according to one embodiment.

FIG. 7 is a flowchart of a process for causing an activation or deactivation of the one or more functions at the at least one first device and/or the at least one second device based, at least in part, on the unavailability of one or more functions at the at least one first device and/or targeted communication towards at least one second device. In one embodiment, the coordination platform 109 performs the process 700 and is implemented in, for instance, a chip set including a processor and a memory as shown in FIG. 16.

In step 701, the coordination platform 109 causes, at least in part, an activation of the one or more functions at the at least one second device based, at least in part, on a determination that a specific function is unavailable at the at least one first device. In one scenario, a user sends an SMS via his/her first UE 101, whereby the coordination platform 109 determines that the SMS service is no longer available in the first UE 101 as the user has depleted his/her SMS plan. Therefore, the coordination platform 109 may transfer the SMS sending function of the first UE 101 to the at least one second UE 101 that has SMS sending facility available.

In step 703, the coordination platform 109 causes, at least in part, an activation of at least one second device based, at least in part, on targeted communication. In one scenario, the coordination platform 109 may instruct the at least one second UE 101 to activate itself based on communication that is directed only towards the at least one second UE 101.

In step 705, the coordination platform 109 causes, at least in part, a notification to at least one first device to cause a synchronization of the targeted communication. In one scenario, the coordination platform 109 may cause a transfer of the targeted communication to the at least one first UE 101 from the at least one second UE 101 in order to avoid overlooking communication targeted to the secondary UE 101.

FIG. 8 is a diagram of a user interface utilized in the process of enabling two or more devices to interact and trigger specific configurable actions. In one scenario, a user may have two or more UE 101 that may be synchronized, and the coordination platform 109 may determine at least one primary device based, at least in part, on device capability information, resource availability information, user configuration, or a combination thereof. The user interface module 211 may present a user with a configuration and/or a setup menu 801 in the primary UE 101. This configuration and/or setup menu may allow the user to set simple rules based on which the at least one second UE 101 may be activated when the set criteria is met with the at least one primary UE 101. In one scenario, the at least one setup menu may comprise of battery level tab 803, data amount tab 805, timer tab 807, proximity data tab 809, and any other data tab 811. In one scenario, second device may be connected to the first device over short range communication network based, at least in part, on the user configuration (813).

Figure 9:
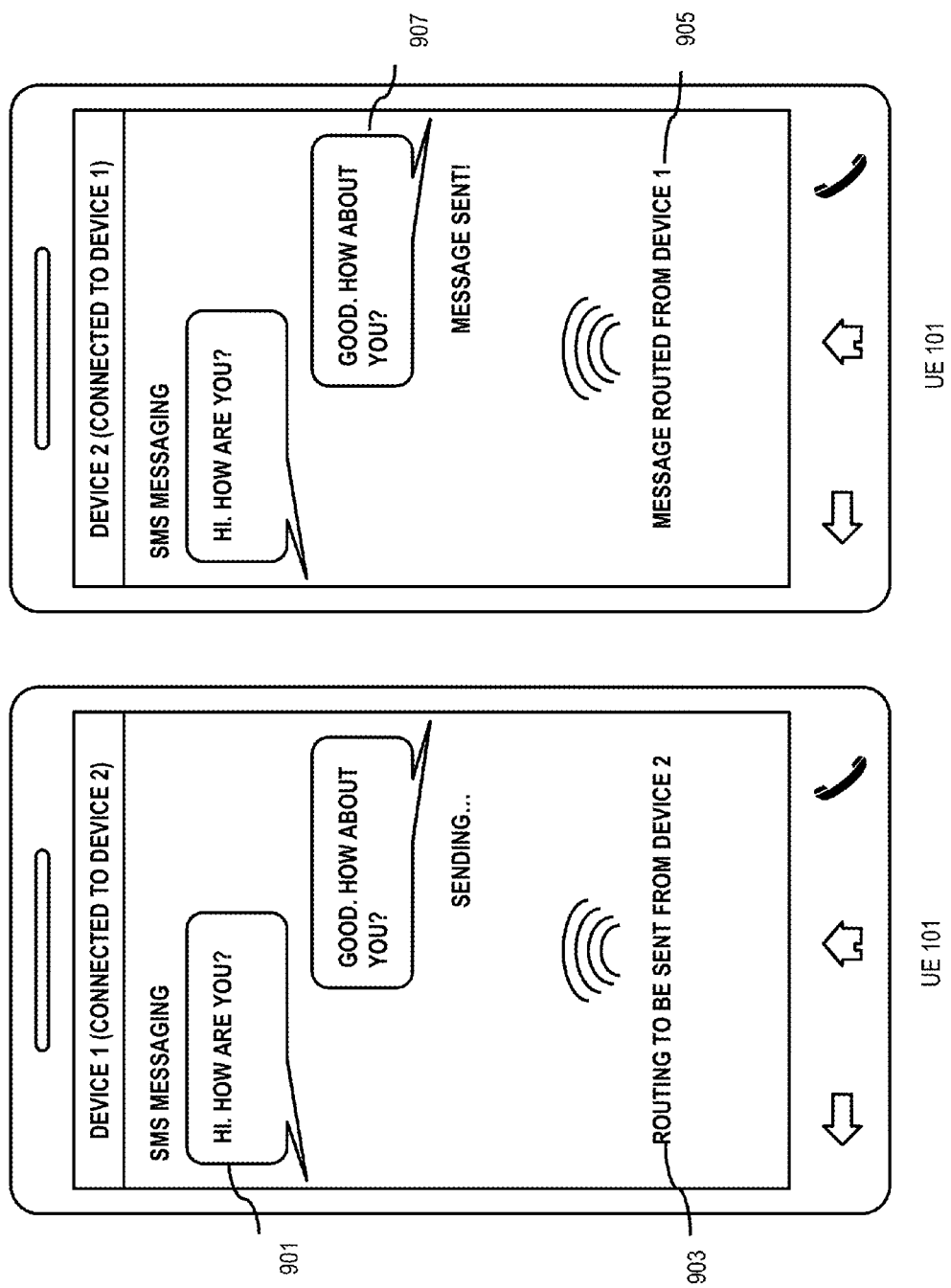

FIG. 9 is a diagram of a user interface that represents a scenario wherein a message sent from the at least one first UE 101 is routed through the at least one second UE 101 based, at least in part, on the battery information, SIM information, temporal information, proximity information, or a combination thereof. In one scenario, the at least one first UE 101 may send an SMS (901), the coordination platform 109 may route the SMS 903, 905) through the at least one second UE 101 because it has a less expensive contract and the SMS can be sent at a cheaper rate (907). In one scenario, the coordination platform 109 may enable at least one first UE 101 to automatically trigger the data connection through at least one second UE 101 having a cheaper contract instead of consuming more expensive data from the at least one first UE 101. In another scenario, while sending SMS with the at least one first device, the SMS is routed over local connectivity radio to the at least one second device, and the SMS is sent using the at least one second device's cellular connection (903, 905).

Figure 10:
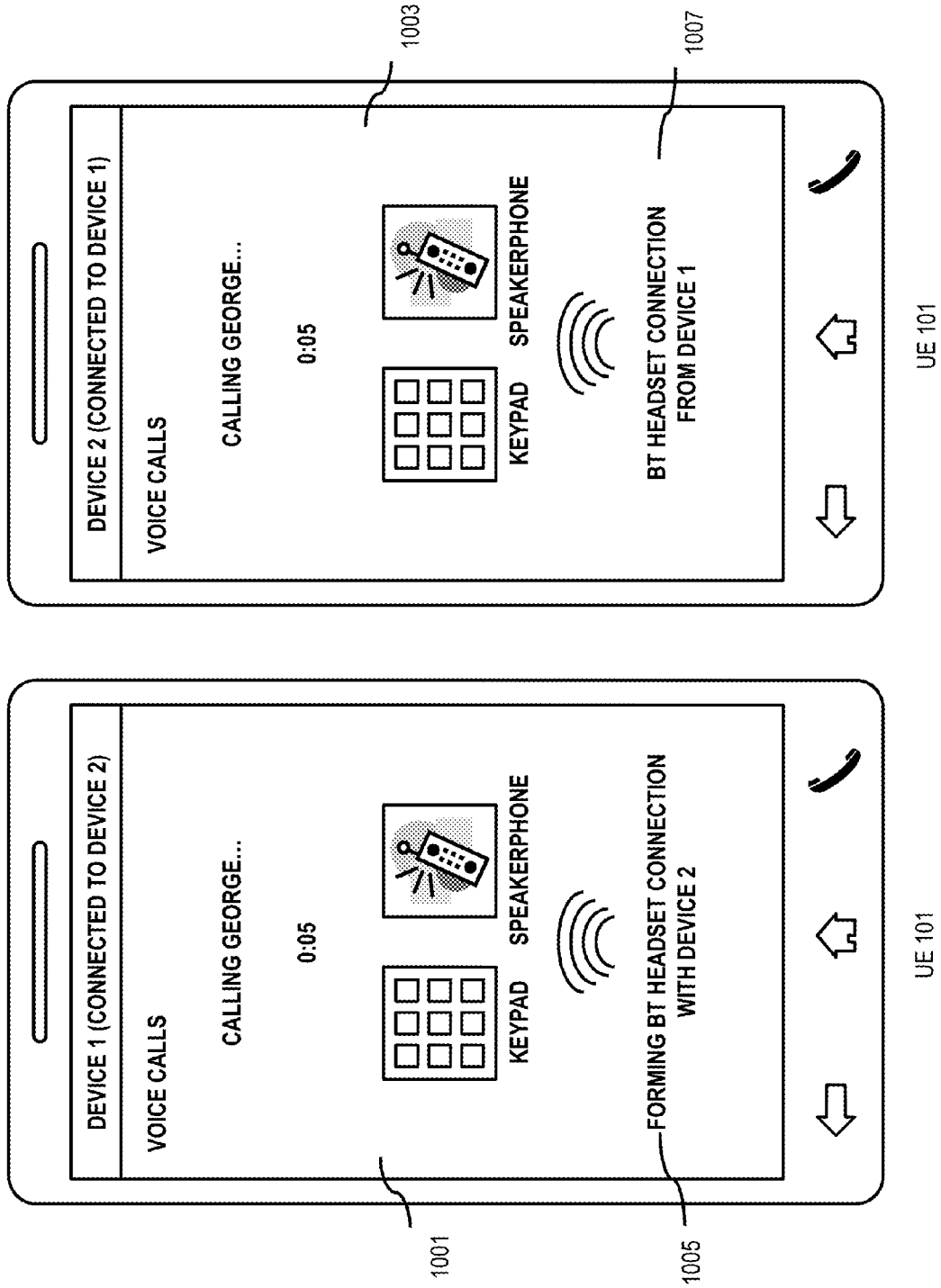

FIG. 10 is a diagram of a user interface that represents a scenario wherein a user makes a voice call through the at least one first UE 101 having a more expensive contract, whereby the coordination platform 109 may route the voice call through the at least one second UE 101 with less expensive voice call cost. In one scenario, the user of the at least one UE 101 makes a voice call to George via at least one first UE 101 with an expensive contract (1001), consequently the coordination platform 109 causes a routing of the voice call through the at least one second UE 101 (1003). Further, the coordination platform 109 may cause a Bluetooth headset connection (1005, 1007) between the one or more configured UE 101s for user convenience, for instance, when at least one first UE 101 initiates a voice call, the coordination platform 109 may form a Bluetooth headset connection with the at least one second UE 101. Thereafter, the at least one first UE 101 may use the services of at least one second UE 101 for voice call and other purposes.

Figure 11:
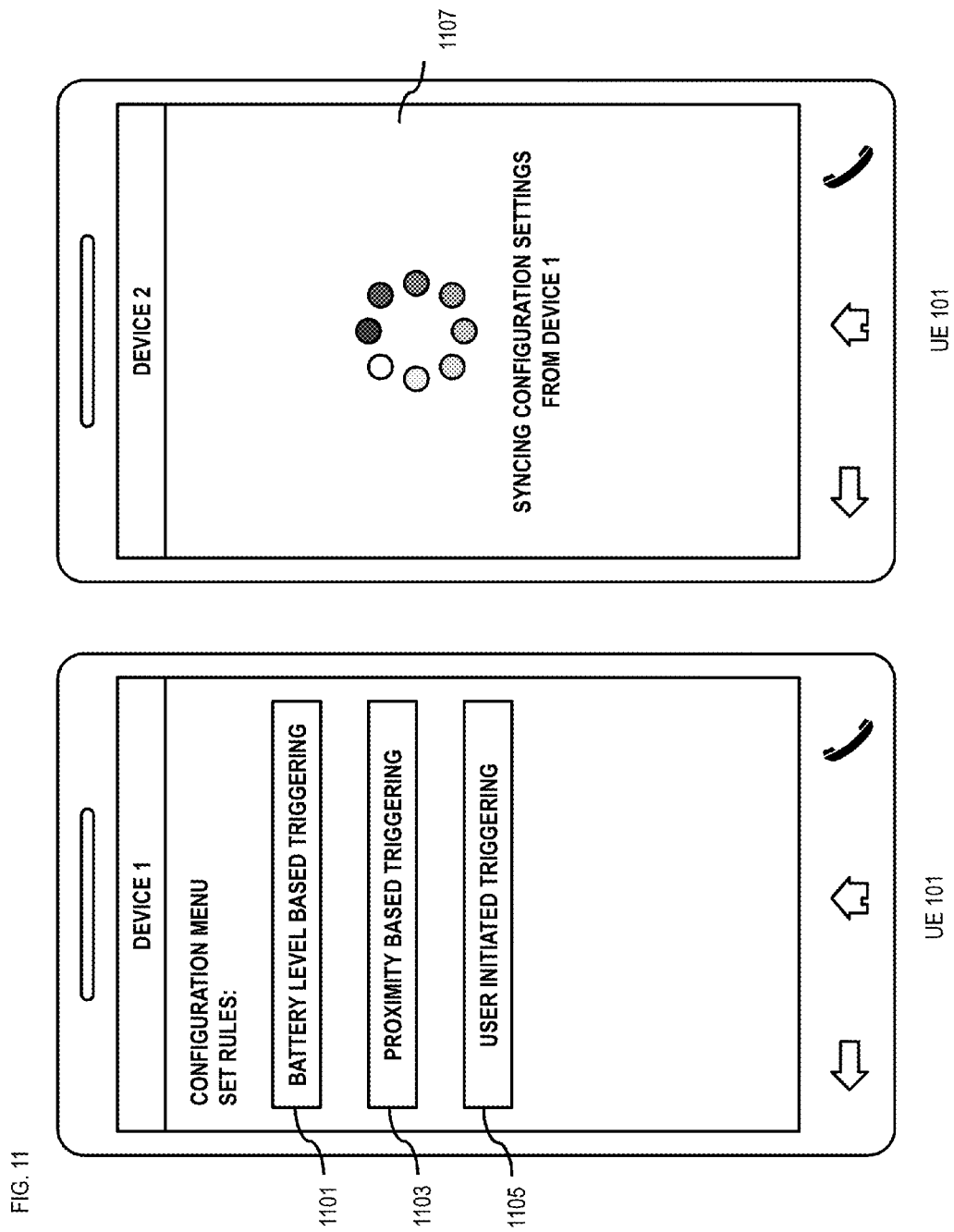

FIG. 11 is a diagram of a user interface that represents a scenario whereby the user of one or more UE 101 may set simple rules to automatically trigger at least one specific configurable action. In one scenario, the rules may be set based on battery level triggering (1101), and/or proximity based triggering (1103), and/or user initiated triggering (1105). In one scenario, a user may want to access the internet with his/her at least one first UE 101, whereby the coordination platform 109 may determine that the at least one first UE 101 has a data gapped contract. For instance, the at least one first UE 101 may have a 2 GB data plan per month, whereby the coordination platform 109 may utilize the total data consumption so that the contract limits are met and not exceeded, and may subsequently route the internet access through at least one second UE 101 that has unlimited data plan, or available data plan, or cheaper data plan. In one scenario, if the at least one first UE 101 with depleted data plan or expensive data plan needs internet access, the coordination platform 109 may cause internet access from at least one second UE 101 within proximity range to trigger the tethering connection using Bluetooth/Bluetooth low energy (BT/BTLE) or some other local radio technology (1107). In another scenario, the one or more UE 101 may also connect over WLAN connection, cellular data connection and so on. Further, the one or more rules may take into account the time of the day, the presence of WLAN for data connectivity instead of cellular connection, and other related rules.

FIG. 12 is a diagram of a user interface that represents a scenario where the battery for at least one first UE 101 is below critical (e.g. 15% capacity left) (1201), whereby the coordination platform 109 activates the at least one second UE 101 over low power local radio link (1203, 1205). In one embodiment, the at least one second UE 101 may be in a low power mode with only BTLE active until it receives the activation command from the coordination platform 109 for performing one or more configurable actions. Subsequently, when the at least one second UE 101 receives the command it may ramp-up its cellular radio and other functions in order to act like the primary UE 101 (1207). Such configuration of automated transmission of one or more communication and enabling the at least one second UE 101 to function in a similar manner as the at least one first UE 101 enhances user experience. In one example embodiment, the at least one first UE 101 may send a call transfer request to the at least one second UE 101 before entering a low power mode. In another embodiment, this call transfer feature is disabled by the coordination platform 109 when the at least one first UE 101 ramps from the low power mode. Such feature enables routing of the calls from primary (or secondary) device by the communication network 107 when the at least one UE 101 is not connected to the communication network 107.

FIG. 13 is a diagram of a user interface that represents a scenario whereby specific configurable actions are triggered on the basis of proximity information. In one scenario, when the at least one first UE 101 and the at least one second UE 101 are getting apart (1301), the coordination platform 109 may activate the at least one second UE 101 via BTLE radio. In one example embodiment, a user may carry the at least one second UE 101 instead of the at least one first UE 101, whereby the coordination platform 109 may determine whether the at least one first UE 101 and the at least one second UE 101 is outside of a range associated with the connection. Subsequently, the coordination platform 109 may cause, at least in part, an activation or a deactivation of at least one first UE 101, or at least one second UE 101. Therefore, based on the proximity information that the UE 101s are more than 5 meters away from each other (1303) the at least one second UE 101 the user is carrying may function as the primary UE 101 (1305). In addition to proximity, there may be number of additional triggers, for instance, temporal information wherein the user may define time limits for activating the at least one second device startup (1307). In one scenario, when two or more configured UE 101 are more than 5 meters away for more than 30 seconds (1303), the coordination platform 109 may either activate or deactivate the at least one first device, or the at least one second device. In one example embodiment, the proximity for the two or more configured UE 101s may be detected using Received Signal Strength Indication (RSSI) measurement of the BTLE link, the acceleration sensors, or a combination thereof (1309, 1311).

Figure 14:
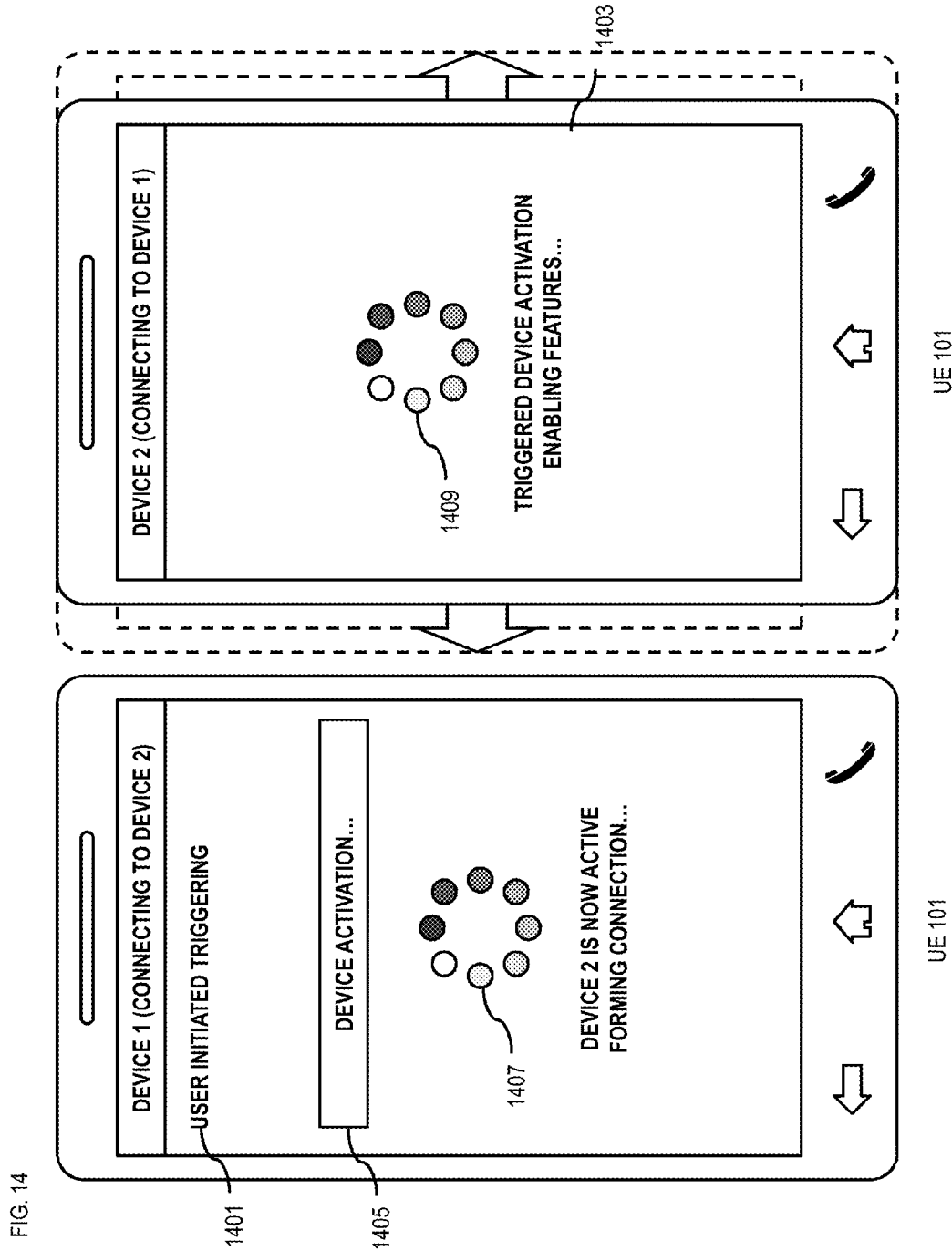

FIG. 14 is a diagram of a user interface that represents a scenario whereby one or more action is triggered by users' configuration. In one scenario, the user may intentionally activate the at least one second UE 101 from the low power mode by predefined actions, for instance, the user may press the power button of the at least one second UE 101 (1401), or shake the second UE 101 (1403), or press the device activation soft-button in the at least one first UE 101 (1405). In one scenario, the at least one second UE 101 can automatically activate itself once or twice per day to enable it to receive communications that are targeted to the at least one second UE 101. Further, the at least one second UE 101 may notify the at least one first UE 101 of such targeted communications and may synchronize the information to the at least one first UE 101 (1407, 1409). In one embodiment, the communication network 107 may support call transfer functionality, whereby a call forwarding option may be implemented. For instance, the at least one first UE 101 may automatically transfer its calls to the at least one second UE 101 before it starts to shut-down. Subsequently, the one or more transferred calls to the at least one second UE 101 may be reverted to the at least one first UE 101 upon activation and determination by the coordination platform 109 that it is in a functioning condition.

The processes described herein for processing contextual information of at least one device and/or at least one other device, to activate one or more functions at the at least one other device upon deactivating the at least one device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 15:
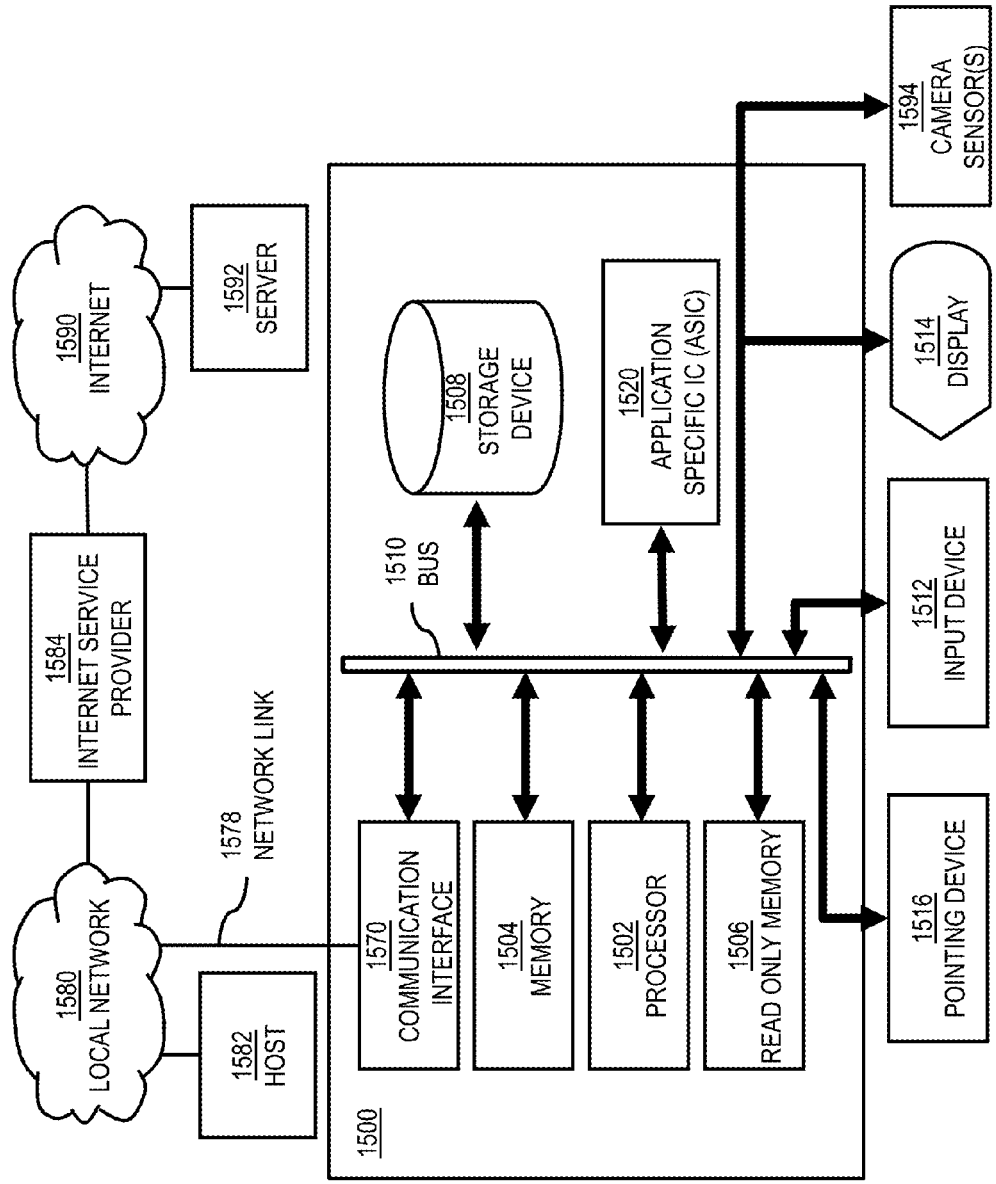
FIG. 15 is a diagram of hardware that can be used to implement an embodiment of the invention.

FIG. 15 illustrates a computer system 1500 upon which an embodiment of the invention may be implemented. Although computer system 1500 is depicted with respect to a particular device or equipment, it is contemplated that other devices or equipment (e.g., network elements, servers, etc.) within FIG. 15 can deploy the illustrated hardware and components of system 1500. Computer system 1500 is programmed (e.g., via computer program code or instructions) to process contextual information of at least one device and/or at least one other device, to activate one or more functions at the at least one other device upon deactivating the at least one device as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of processing contextual information of at least one device and/or at least one other device, to activate one or more functions at the at least one other device upon deactivating the at least one device.

A bus 1510 includes one or more parallel conductors of information so that information is transferred quickly among devices coupled to the bus 1510. One or more processors 1502 for processing information are coupled with the bus 1510.

A processor (or multiple processors) 1502 performs a set of operations on information as specified by computer program code related to process contextual information of at least one device and/or at least one other device, to activate one or more functions at the at least one other device upon deactivating the at least one device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1500 also includes a memory 1504 coupled to bus 1510. The memory 1504, such as a random access memory (RAM) or any other dynamic storage device, stores information including processor instructions for processing contextual information of at least one device and/or at least one other device, to activate one or more functions at the at least one other device upon deactivating the at least one device. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or any other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for processing contextual information of at least one device and/or at least one other device, to activate one or more functions at the at least one other device upon deactivating the at least one device, is provided to the bus 1510 for use by the processor from an external input device 1512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT), a liquid crystal display (LCD), a light emitting diode (LED) display, an organic LED (OLED) display, a plasma screen, or a printer for presenting text or images, and a pointing device 1516, such as a mouse, a trackball, cursor direction keys, or a motion sensor, for controlling a position of a small cursor image presented on the display 1514 and issuing commands associated with graphical elements presented on the display 1514, and one or more camera sensors 1594 for capturing, recording and causing to store one or more still and/or moving images (e.g., videos, movies, etc.) which also may comprise audio recordings. In some embodiments, for example, in embodiments in which the computer system 1500 performs all functions automatically without human input, one or more of external input device 1512, display device 1514 and pointing device 1516 may be omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of ASICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communication interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communication interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communication interface 1570 may be a local area network (LAN) card to provide a data communication connection to a compatible LAN, such as Ethernet. Wireless links may also be implemented. For wireless links, the communication interface 1570 sends or receives or both sends and receives electrical, acoustic or electromagnetic signals, including infrared and optical signals, that carry information streams, such as digital data. For example, in wireless handheld devices, such as mobile telephones like cell phones, the communication interface 1570 includes a radio band electromagnetic transmitter and receiver called a radio transceiver. In certain embodiments, the communication interface 1570 enables connection to the communication network 107 for processing contextual information of at least one device and/or at least one other device, to activate one or more functions at the at least one other device upon deactivating the at least one device to the UE 101.

The term "computer-readable medium" as used herein refers to any medium that participates in providing information to processor 1502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1508. Volatile media include, for example, dynamic memory 1504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1520.

Network link 1578 typically provides information communication using transmission media through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590.

A computer called a server host 1592 connected to the Internet hosts a process that provides a service in response to information received over the Internet. For example, server host 1592 hosts a process that provides information representing video data for presentation at display 1514. It is contemplated that the components of system 1500 can be deployed in various configurations within other computer systems, e.g., host 1582 and server 1592.

At least some embodiments of the invention are related to the use of computer system 1500 for implementing some or all of the techniques described herein. According to one embodiment of the invention, those techniques are performed by computer system 1500 in response to processor 1502 executing one or more sequences of one or more processor instructions contained in memory 1504. Such instructions, also called computer instructions, software and program code, may be read into memory 1504 from another computer-readable medium such as storage device 1508 or network link 1578. Execution of the sequences of instructions contained in memory 1504 causes processor 1502 to perform one or more of the method steps described herein. In alternative embodiments, hardware, such as ASIC 1520, may be used in place of or in combination with software to implement the invention. Thus, embodiments of the invention are not limited to any specific combination of hardware and software, unless otherwise explicitly stated herein.

The signals transmitted over network link 1578 and other networks through communication interface 1570, carry information to and from computer system 1500. Computer system 1500 can send and receive information, including program code, through the networks 1580, 1590 among others, through network link 1578 and communication interface 1570. In an example using the Internet 1590, a server host 1592 transmits program code for a particular application, requested by a message sent from computer 1500, through Internet 1590, ISP equipment 1584, local network 1580 and communication interface 1570. The received code may be executed by processor 1502 as it is received, or may be stored in memory 1504 or in storage device 1508 or any other non-volatile storage for later execution, or both. In this manner, computer system 1500 may obtain application program code in the form of signals on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red carrier wave serving as the network link 1578. An infrared detector serving as communication interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

FIG. 16 illustrates a chip set or chip 1600 upon which an embodiment of the invention may be implemented. Chip set 1600 is programmed to process contextual information of at least one device and/or at least one other device, to activate one or more functions at the at least one other device upon deactivating the at least one device as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1600 can be implemented in a single chip. It is further contemplated that in certain embodiments the chip set or chip 1600 can be implemented as a single "system on a chip." It is further contemplated that in certain embodiments a separate ASIC would not be used, for example, and that all relevant functions as disclosed herein would be performed by a processor or processors. Chip set or chip 1600, or a portion thereof, constitutes a means for performing one or more steps of providing user interface navigation information associated with the availability of functions. Chip set or chip 1600, or a portion thereof, constitutes a means for performing one or more steps of processing contextual information of at least one device and/or at least one other device, to activate one or more functions at the at least one other device upon deactivating the at least one device.

In one embodiment, the chip set or chip 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1600 includes merely one or more processors and some software and/or firmware supporting and/or relating to and/or for the one or more processors.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to process contextual information of at least one device and/or at least one other device, to activate one or more functions at the at least one other device upon deactivating the at least one device. The memory 1605 also stores the data associated with or generated by the execution of the inventive steps.

Figure 17:
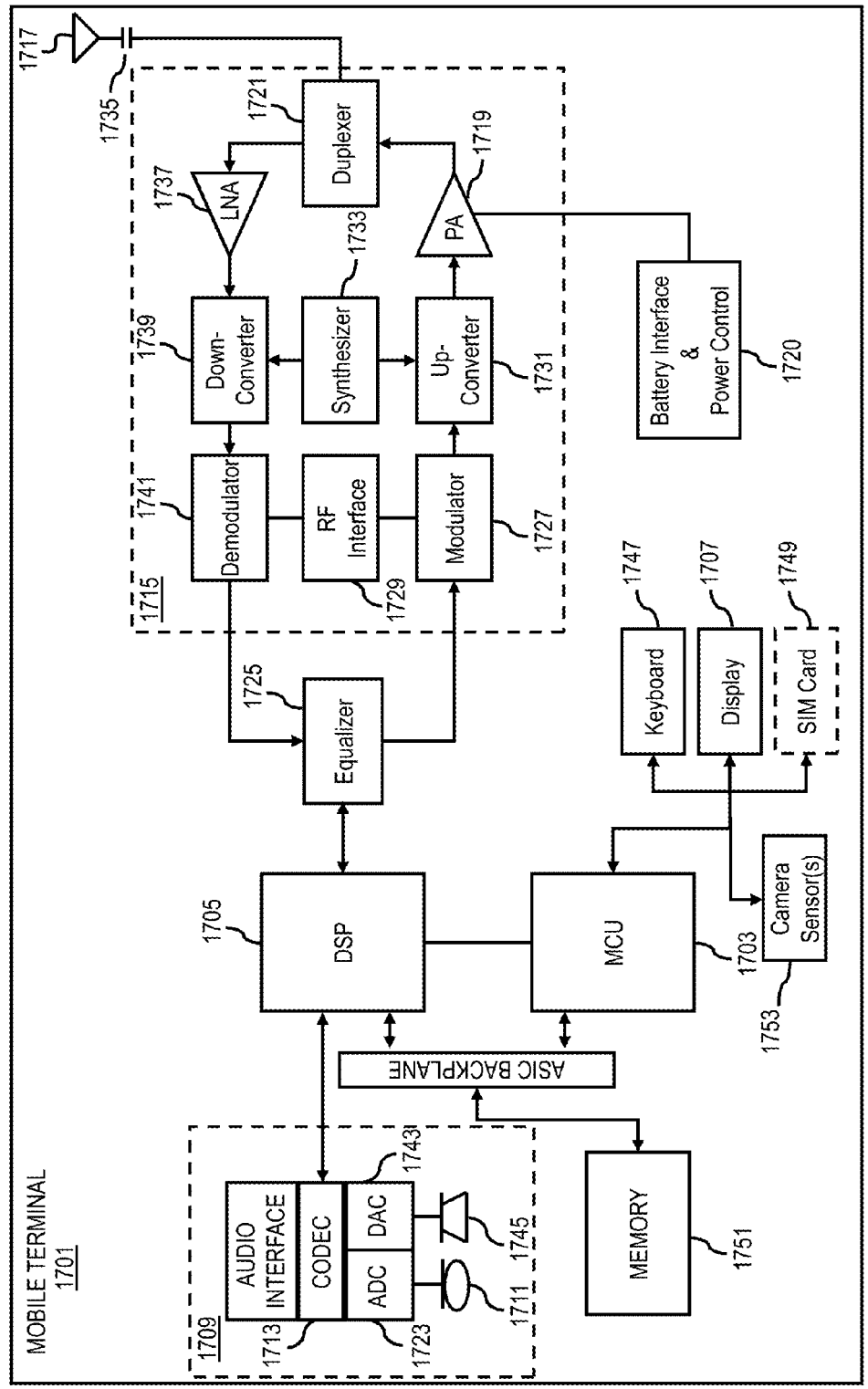
FIG. 17 is a diagram of a mobile terminal (e.g., handset) that can be used to implement an embodiment of the invention.

FIG. 17 is a diagram of exemplary components of a mobile terminal (e.g., handset) for communications, which is capable of operating in the system of FIG. 1, according to one embodiment. In some embodiments, mobile terminal 1701, or a portion thereof, constitutes a means for performing one or more steps of processing contextual information of at least one device and/or at least one other device, to activate one or more functions at the at least one other device upon deactivating the at least one device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile terminal functions that perform or support the steps of processing contextual information of at least one device and/or at least one other device, to activate one or more functions at the at least one other device upon deactivating the at least one device. The display 1707 includes display circuitry configured to display at least a portion of a user interface of the mobile terminal (e.g., mobile telephone). Additionally, the display 1707 and display circuitry are configured to facilitate user control of at least some functions of the mobile terminal. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile terminal 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703 which can be implemented as a Central Processing Unit (CPU).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile terminal 1701 to process contextual information of at least one device and/or at least one other device, to activate one or more functions at the at least one other device upon deactivating the at least one device. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the terminal. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile terminal 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable storage medium known in the art. The memory device 1751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1749 carries, for instance, important information, such as the cellular phone number, the carrier supplying service, subscription details, and security information. The SIM card 1749 serves primarily to identify the mobile terminal 1701 on a radio network. The card 1749 also contains a memory for storing a personal telephone number registry, text messages, and user specific mobile terminal settings.

Further, one or more camera sensors 1753 may be incorporated onto the mobile station 1701 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by an apparatus, contextual information for at least one first device and at least one second device, wherein the contextual information is based, at least in part, on a distance between the at least one first device and the at least one second device and a limit of total data consumption cost of the at least one first device and the at least one second device;
    processing, by the apparatus, the contextual information to determine one or more functions to deactivate at the at least one first device based, at least in part, on that the distance goes beyond a predetermined value and that the limit of total data consumption cost remains below another predetermined value;
    initiating, by the apparatus, a transfer of the one or more functions from the at least one first device to the at least one second device via one or more short range wireless communication connections; and
    initiating, by the apparatus, a deactivation of the one or more functions at the at least one first device,
    wherein the apparatus is embedded in the at least one first device or the at least one second device.

2. A method of claim 1, further comprising:
    initiating a presentation of at least one user interface at the at least one first device for controlling the one or more functions transferred to the at least one second device,
    wherein the distance is determined based, at least in part, on the one or more short range wireless communication connections, and
    wherein the total data consumption cost is calculated base on one or more service contract rates, one or more function operating time efficiencies, one or more function power consumption efficiencies, or a combination thereof.

3. A method of claim 1, further comprising:
    initiating an establishment of the one or more short range wireless communication connections between the at least one first device and the at least one second device,
    wherein the transfer of the one or more functions is performed over the one or more short range wireless communication connections.

4. A method of claim 3, further comprising:
    initiating a synchronization of data between the at least one first device and the at least one second device via the one or more short range wireless communication connections, wherein the one or more short range wireless communication connections include bluetooth radio, near field communication, or a combination thereof; and
    triggering the one or more functions on the at least one second device based, at least in part, on the activation command from the at least one first device.

5. A method of claim 1, further comprising:
    determining at least one first device as a primary device based, at least in part, on device capability information, resource availability information, user configuration, or a combination thereof,
    wherein the distance is determined based on a user checking-in on a social networking service via the at least one first device, the at least one second device, or a combination thereof.

6. A method of claim 1, wherein contextual information further includes battery level information, user configuration, temporal information, Subscriber Identity Module (SIM) information, status information, or a combination thereof.

7. A method of claim 1, further comprising:
    initiating an activation of the one or more functions at the at least one second device based, at least in part, on a determination that the battery level for at least one first device is below a minimum threshold.

8. A method of claim 1, wherein the one or more functions are deactivated at the at least one first device based, at least in part, on that the distance goes beyond the predetermined value for a predetermined time period.

9. A method of claim 1, further comprising:
    initiating an activation of the one or more functions at the at least one second device based, at least in part, on a determination that a specific function is unavailable at the at least one first device.

10. A method of claim 1, further comprising:
    initiating an activation of at least one second device based, at least in part, on targeted communication; and
    initiating a notification to at least one first device to cause a synchronization of the targeted communication.

11. An apparatus comprising:
    at least one processor; and
    at least one memory including computer program code for one or more programs,
    the at least one memory and the computer program code configured to, with the at least one processor, cause the apparatus to perform at least the following,
        determine contextual information for at least one first device and at least one second device, wherein the contextual information is based, at least in part, on a distance between the at least one first device and the at least one second device and a limit of total data consumption cost of the at least one first device and the at least one second device;
        process the contextual information to determine one or more functions to deactivate at the at least one first device based, at least in part, on that the distance goes beyond a predetermined value and that the limit of total data consumption cost remains below another predetermined value;

initiate a transfer of the one or more functions from the at least one first device to the at least one second device via one or more short range wireless communication connections; and initiate a deactivation of the one or more functions at the at least one first device, wherein the apparatus is embedded in the at least one first device or the at least one second device.

12. An apparatus of claim 11, wherein the apparatus is further caused to:

initiate a presentation of at least one user interface at the at least one first device for controlling the one or more functions transferred to the at least one second device, wherein the distance is determined based, at least in part, on the one or more short range wireless communication connections.

13. An apparatus of claim 11, wherein the apparatus is further caused to:

initiate an establishment of the one or more short range wireless communication connections between the at least one first device and the at least one second device, wherein the transfer of the one or more functions is performed over the one or more short range wireless communication connections.

14. An apparatus of claim 11, wherein the apparatus is further caused to:

initiate a synchronization of data between the at least one first device and the at least one second device via the one or more short range wireless communication connections, wherein the one or more short range wireless communication connections include bluetooth radio, near field communication, or a combination thereof; and trigger the one or more functions on the at least one second device based, at least in part, on the activation command from the at least one first device.

15. An apparatus of claim 11, wherein the apparatus is further caused to:

determine at least one first device as a primary device based, at least in part, on device capability information, resource availability information, user configuration, or a combination thereof.

16. An apparatus of claim 11, wherein contextual information further includes battery level information, user configuration, temporal information, Subscriber Identity Module (SIM) information, status information, or a combination thereof.

17. An apparatus of claim 11, wherein the apparatus is further caused to:

initiate an activation of the one or more functions at the at least one second device based, at least in part, on a determination that the battery level for at least one first device is below a minimum threshold.

18. An apparatus of claim 11, wherein the one or more functions are deactivated at the at least one first device based, at least in part, on that the distance goes beyond the predetermined value for a predetermined time period.

19. An apparatus of claim 11, wherein the apparatus is further caused to:

initiate an activation of the one or more functions at the at least one second device based, at least in part, on a determination that a specific function is unavailable at the at least one first device.

20. An apparatus of claim 11, wherein the apparatus is further caused to:

initiate an activation of at least one second device based, at least in part, on targeted communication; and initiate a notification to at least one first device to cause a synchronization of the targeted communication.

* * * * *